US009048726B1

(12) United States Patent
Tang et al.

(10) Patent No.: US 9,048,726 B1
(45) Date of Patent: Jun. 2, 2015

(54) POWER SYSTEM HAVING REPETITIVE CONTROL IN SYMMETRIC SEQUENCES WITH HARMONICS CANCELLATION

(71) Applicant: The Boeing Company, Chicago, IL (US)

(72) Inventors: Qingquan Tang, Brooklyn, NY (US); Dariusz Czarkowski, S. Setauket, NY (US); Francisco de Leon, Ridgewood, NJ (US); Kamiar Karimi, Kirkland, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 13/794,397

(22) Filed: Mar. 11, 2013

(51) Int. Cl.
*H02M 1/12* (2006.01)

(52) U.S. Cl.
CPC .................................... *H02M 1/12* (2013.01)

(58) Field of Classification Search
USPC .......... 363/39–43, 98, 132; 307/105, 14, 127, 307/151, 9.1
See application file for complete search history.

(56) References Cited

U.S. PATENT DOCUMENTS

| | | |
|---|---|---|
| 5,740,090 A | 4/1998 | Steinbuch et al. |
| 7,904,495 B2 | 3/2011 | Ramos et al. |
| 8,385,096 B2 * | 2/2013 | Yuzurihara et al. ............ 363/127 |

OTHER PUBLICATIONS

Chew, Kok Kia et al., Digital Control of Repetitive Errors in Disk Drive Systems, IEEE Control Systems Magazine, Jan. 1990, pp. 16-20. (5 pages).
Costa-Castello, Ramon, et al., Odd-Harmonic Digital Repetitive Control of a Single-Phase Current Active Filter, IEEE Transactions on Power Electronics, vol. 19, No. 4, Jul. 2004, pp. 1060-1068. (9 pages).
Demirkutlu, Eyyup, et al., A Scalar Resonant-Filter-Bank-Based Output-Voltage Control Method and a Scalar Minimum-Switching-Loss Discontinuous PWM Method for the Four-Leg-Inverter-Based three-Phase Four-Wire Power Supply, IEEE Transactions on Power Electronics, vol. 45, No. 3, May/Jun. 2009, pp. 982-991. (10 pages).
Kim, Jang-Hwan, et al., A Carrier-Based PWM Method for Three-Phase Four-Leg Voltage Source Converters, IEEE Transactions on Power Electronics, vol. 19, No. 1, Jan. 2004, pp. 66-75. (10 pages).

(Continued)

*Primary Examiner* — Nguyen Tran
*Assistant Examiner* — Kyle J Moody
(74) *Attorney, Agent, or Firm* — Kunzler Law Group, PC

(57) ABSTRACT

A control system for a power drive section of a three-phase system is disclosed. The control system comprises a positive sequence channel, a negative sequence channel, and a zero sequence channel. The positive sequence channel processes positive sequence error signals, the negative sequence channel processes negative sequence error signals, and the zero sequence channel processes zero sequence error signals. Each sequence channel includes a harmonic repetitive controller, a repetitive controller compensator, and a fundamental frequency controller configured to operate in parallel with the harmonic repetitive controller and repetitive controller compensator. Both the repetitive controller compensator of the negative sequence channel and the repetitive controller compensator of the positive sequence channel are configured with the same, first frequency response. The repetitive controller compensator of the zero sequence channel is configured with a second frequency response that is different from the first frequency response.

21 Claims, 20 Drawing Sheets

(56) References Cited

OTHER PUBLICATIONS

Mohd, A., et al., Control Strategy and Space Vector Modulation for Three-Leg Four-Wire Voltage Source Inverters Under Unbalanced Load Conditions. Copyright, The Institution of Engineering and Technology, 2010. Published in IET Power Electronics, 2010, vol. 3, Iss. 3, pp. 323-333, www.ietdl.org. (11 pages).

Ryan, Michael J., et al., Decoupled Control of a Four-Leg Inverter via a New 4×4 Transformation Matrix, IEEE Transactions on Power Electronics, vol. 16, No. 5, Sep. 2001, pp. 694-701. (8 pages).

Vechiu, Ionel, et al., Transient Operation of a Four-Leg Inverter for Autonomous Applications With Unbalanced Load, IEEE Transactions on Power Electronics, vol. 25, No. 2, Feb. 2010, pp. 399-407. (9 pages).

Zhang, Kai et al., Direct Repetitive Control of SPWM Inverter for UPS Purpose, IEEE Transactions on Power Electronics, vol. 18, No. 3, May 2003, pp. 784-792. (9 pages).

Zhang, Richard, et al., Three-Dimensional Space Vector Modulation for Four-Leg Voltage-Source Converters, IEEE Transactions on Power Electronics, vol. 17, No. 3, May 2002, pp. 314-326. (13 pages).

Zhou, Keliang et al., Digital Repetitive Learning Controller for Three-Phase CVCF PWM Inverter, IEEE Transactions on Power Electronics, vol. 48, No. 4, Aug. 2001, pp. 820-930. (11 pages).

Zhou, Keliang, et al., Plug-In Dual-Mode-Structure Repetitive Controller for CVCF PWM Inverters, IEEE Transactions on Power Electronics, vol. 56, No. 3, Mar. 2009, pp. 784-791. (8 pages).

\* cited by examiner

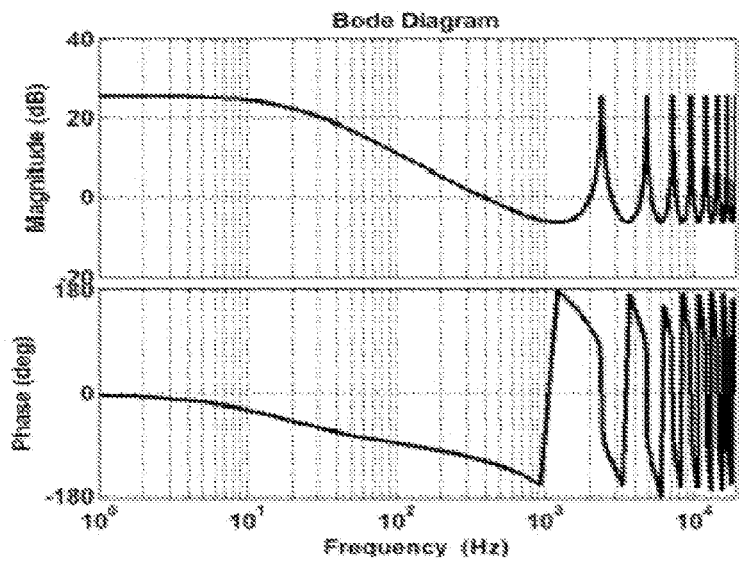
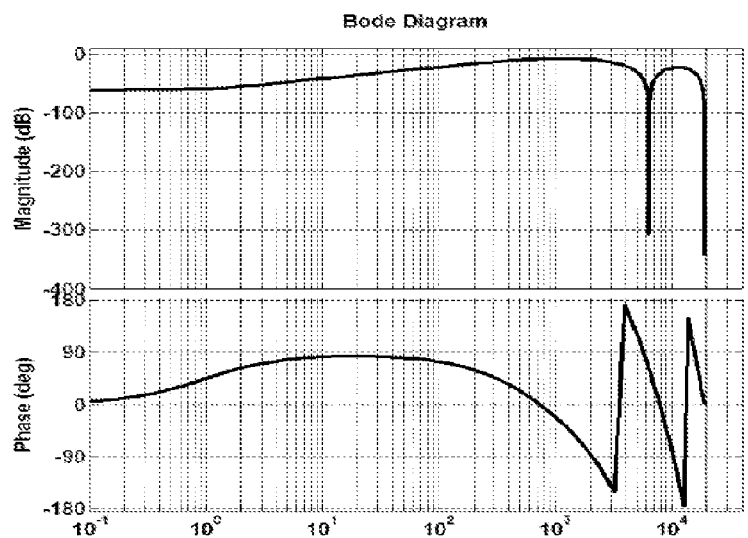
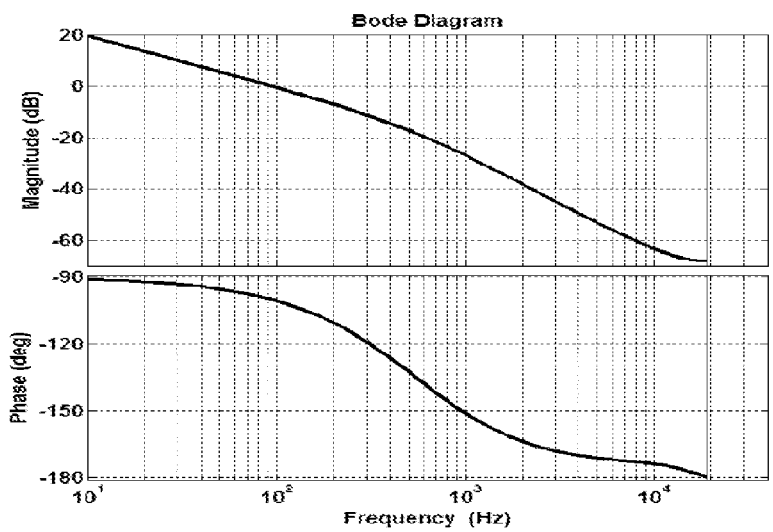
FIGURE 5
(a)
(b)
(c)

(a)

(b)

(c)

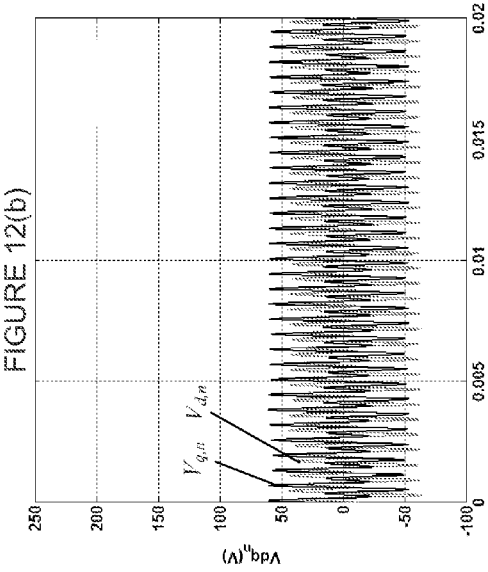
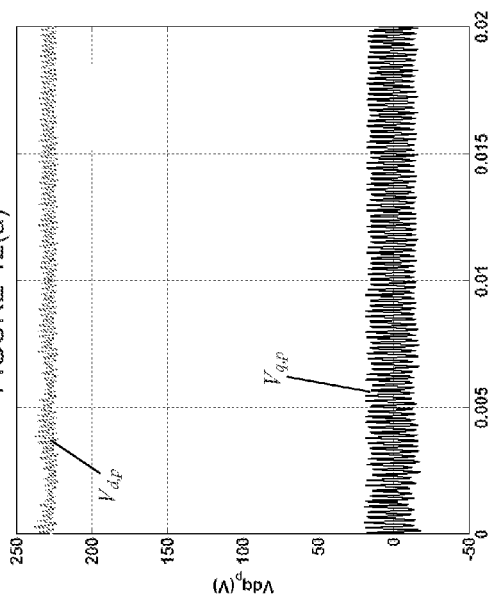
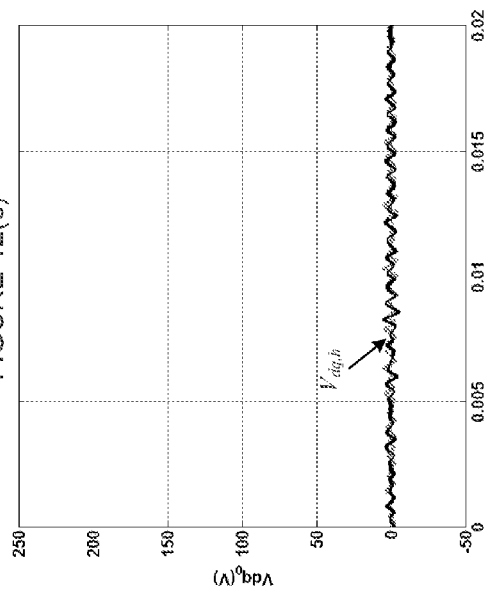

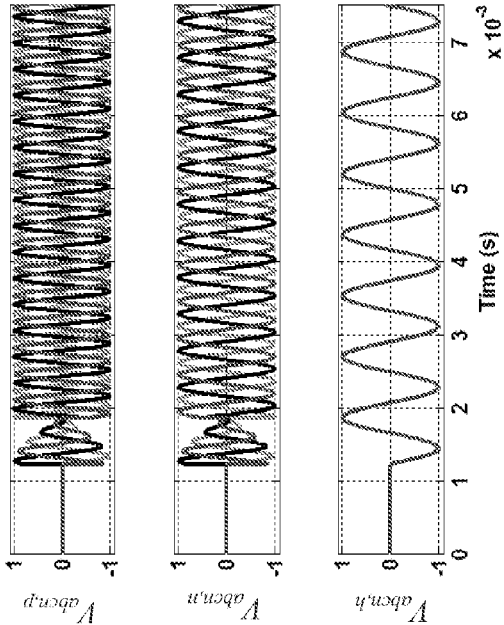
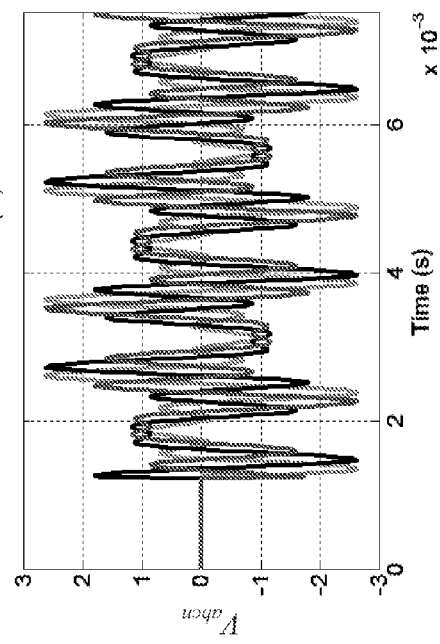
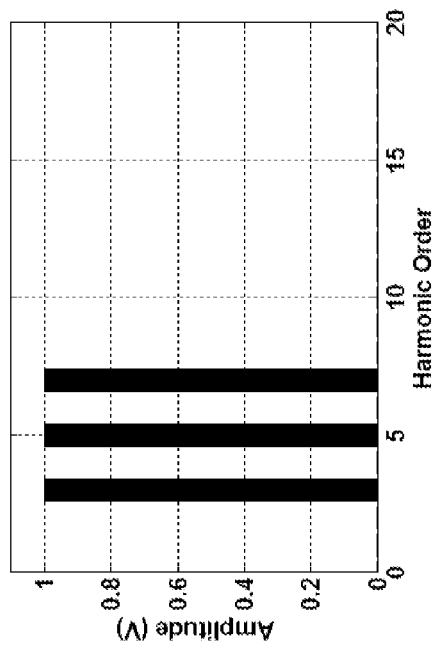
FIGURE 15(a)
FIGURE 15(b)
FIGURE 15(c)

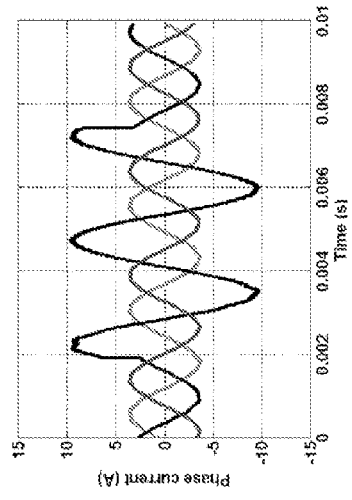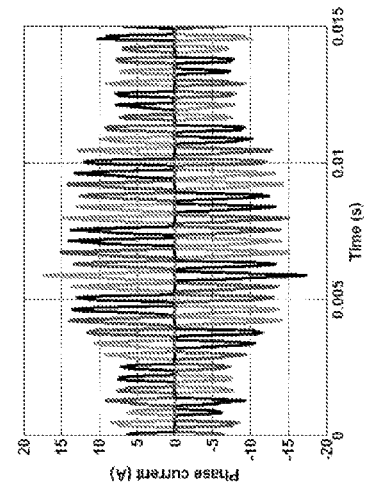
FIGURE 20
FIGURE 21
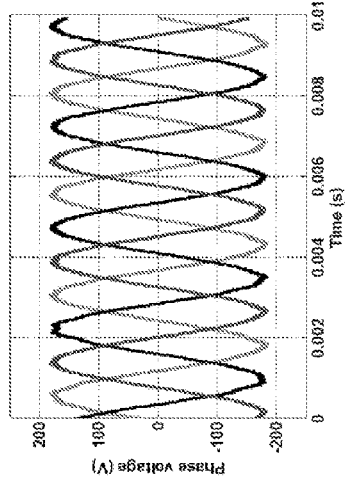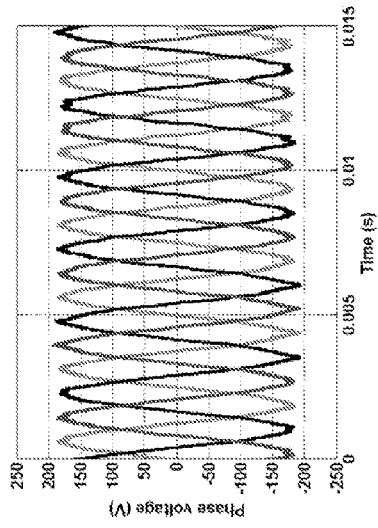

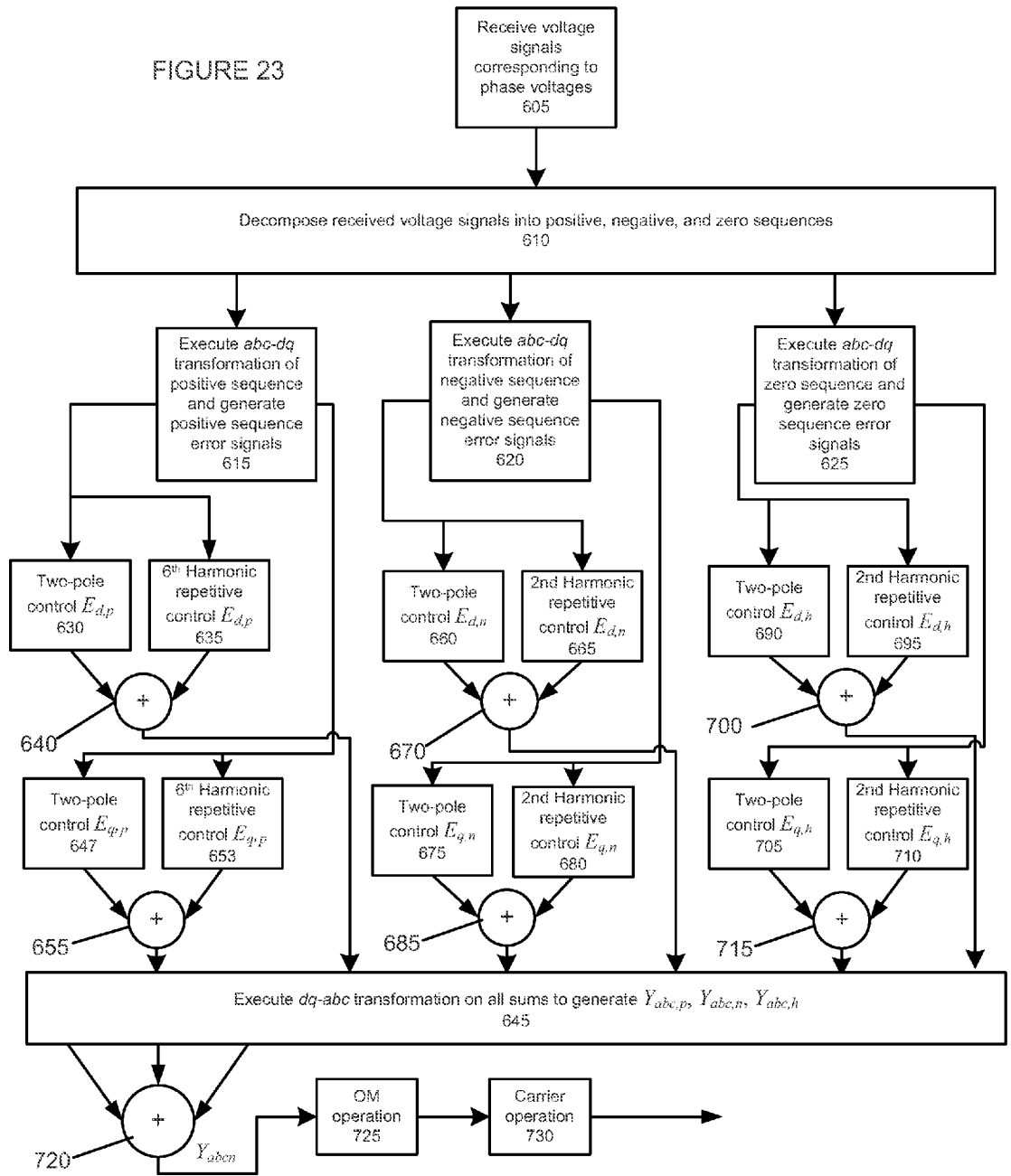

POWER SYSTEM HAVING REPETITIVE CONTROL IN SYMMETRIC SEQUENCES WITH HARMONICS CANCELLATION

BACKGROUND

Power converters are used in aircraft electrical power systems as well as in power systems for other apparatus. The electrical power systems on current commercial aircraft are primarily provided by 400 Hz, three-phase 115V or 230V AC power sources. The power system may include one or more alternative low voltage DC power sources, such as a fuel cell stack or a battery, which provides input power to a pulse width modulated (PWM) power conversion system. Multiphase power, such as three-phase power, may be provided to an aircraft electric power distribution system, which, in turn, provides the electrical power to a downstream distribution system. The downstream distribution system may have loads of various types, including, but not limited to, three-phase, single-phase, or another conversion system with DC loads, etc.

A problem with such multiphase power systems is that they may be presented with different types of loads. In three-phase systems, such loads include 1) three-phase balanced linear loads, 2) three-phase unbalanced linear loads, 3) three-phase balanced nonlinear loads, and 4) three phase unbalanced nonlinear loads. Disturbances in the supply output voltages occur when driving nonlinear or unbalanced loads. The disturbances often include specific higher harmonics of the fundamental frequency of the power system. Achieving fast dynamic response while concurrently meeting total harmonic distortion (THD) requirements becomes problematic.

Repetitive control has been used in an attempt to reduce the presence of such harmonics. This type of control attempts to provide asymptotic output tracking of periodic portions of the supply output voltages while rejecting the periodic harmonic disturbances that are present. Generally stated, it is based on the Internal Model Principal and used to deal with periodic signals, for example, tracking periodic reference signals or rejecting periodic disturbances. The repetitive controller may incorporate an internal model, and a local positive feedback of a delay line cascaded with a low-pass filter, to track or reject periodic signals. Additional compensation may be used for the system stability purpose.

Although repetitive controllers are used to provide rejection of harmonics in power systems, they often have a slow dynamic response. High performance in both transient and steady-state may therefore be difficult to achieve using repetitive controllers.

SUMMARY

A control system for use in controlling a power drive section of a three-phase power system is disclosed, where the three-phase power system is configured to provide phase voltages at a fundamental frequency. The control system comprises a positive sequence channel, a negative sequence channel, and a zero sequence channel. The positive sequence channel is configured to process positive sequence error signals corresponding to positive sequences of the phase voltages in a dq coordinate system. The positive sequence channel includes at least one harmonic repetitive controller, at least one repetitive controller compensator, and at least one fundamental frequency controller configured to operate in parallel with the at least one harmonic repetitive controller and the at least one repetitive controller compensator. The negative sequence channel is configured to process negative sequence error signals corresponding to negative sequences of the phase voltages in the dq coordinate system. The negative sequence channel includes at least one harmonic repetitive controller, at least one repetitive controller compensator, and at least one fundamental frequency controller configured to operate in parallel with the at least one harmonic repetitive controller and the at least one repetitive controller compensator. Both the repetitive controller compensator of the negative sequence channel and the repetitive controller compensator of the positive sequence channel are configured with the same, first frequency response.

The zero sequence channel is configured to process zero sequence error signals corresponding to zero sequences of the phase voltages in the dq coordinate system. The zero sequence channel includes at least one harmonic repetitive controller, at least one repetitive controller compensator, and at least one fundamental frequency controller configured to operate in parallel with the at least one harmonic repetitive controller and the at least one repetitive controller compensator. The repetitive controller compensator of the zero sequence channel is configured with a second frequency response that is different from the first frequency response of the repetitive controller compensators of the positive and negative sequence channels.

In one example, the first frequency response includes a negative notch at a corner frequency of the power drive section in both the positive sequences and negative sequences of the phase voltages. Also, the second frequency response includes a negative notch at a corner frequency of the power drive section in the zero sequences of the phase voltages.

In a further example, the at least one fundamental frequency controller of the positive sequence channel and the at least one fundamental frequency controller of the negative sequence channel each have a pole at a frequency below the overshoot frequency of the power drive section. Additionally, the at least one fundamental frequency controller of the zero sequence channel has a pole at another frequency above the overshoot frequency of the power drive section.

The features, functions, and advantages that have been discussed can be achieved independently in various embodiments or may be combined in yet other embodiments further details of which can be seen with reference to the following description and drawings

BRIEF DESCRIPTION OF THE DRAWINGS

FIG. 5($a$) is an example of a bode plot having a response that may be used for each of the harmonic repetitive controllers of the positive sequence channel.

FIG. 5($b$) is an example of a bode plot having a response that may be used for each compensator of the positive and negative sequence channels.

FIG. 5($c$) is an example of a bode plot having a response that may be used for each two-pole filter of the positive and negative sequence channels.

FIG. 6(b) is an example of a bode plot having a response that may be used for each of the compensators of the zero sequence channel.

FIG. 6(c) is an example of bode plot having a response that may be used for each of the two-pole filters in the zero sequence channel.

FIGS. 12(a) through 12(c) illustrate dq transformations of the signals shown in FIGS. 11(b) through 11(d).

FIGS. 15(a) through 15(c) illustrate the transient of symmetric sequences decomposition.

FIGS. 16-22 are graphs comparing power systems employing the disclosed control system with those using other control architectures.

FIG. 23 illustrates a method that may be used to control a three-phase power system.

DETAILED DESCRIPTION

Figure 1:
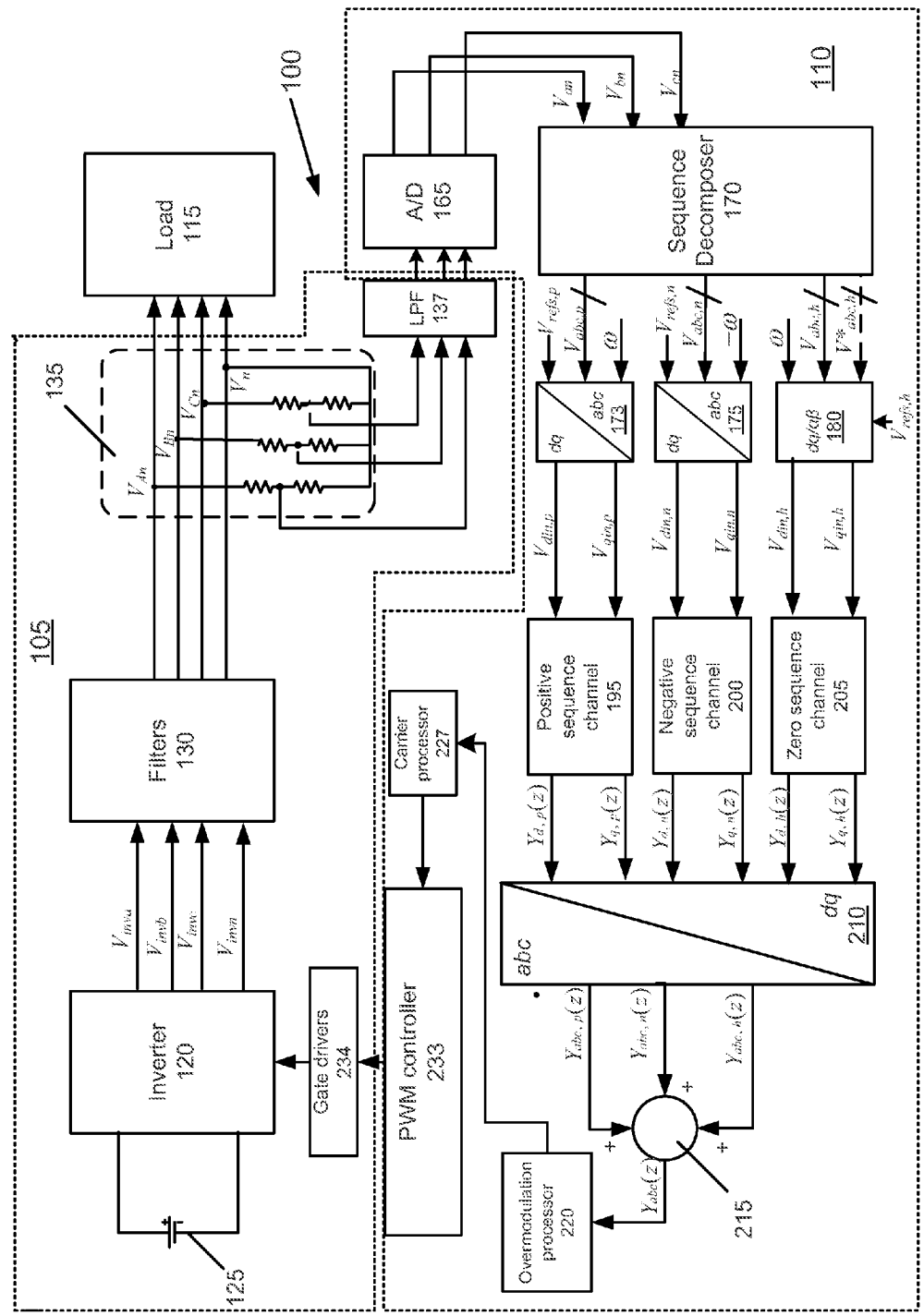
FIG. 1 is a block diagram of a three-phase power system having a power drive section and a control system.

FIG. 1 is a block diagram of a three-phase power system 100 having a power drive section 105 and a control system 110. The power system 100 provides three-phase power to one or more loads 115 in which three voltages are phased approximately 120° from one another.

Example of Power Drive Section

The power drive section 105 is configured as a PWM supply and includes one or more inverters. In the power drive section of FIG. 1, only a single inverter 120 is employed. The inverter 120 receives input power from, for example, a DC power source 125 from which it provides a plurality of PWM output voltages. The number of PWM output voltages provided by the inverter 120 is at least as large as the number of phases used to drive the load 115. As illustrated, the inverter 120 provides a first PWM output voltage $V_{inva}$, a second PWM output voltage $V_{invb}$, and a third PWM output voltage $V_{invc}$.

The power system 100 of the example is configured as a four-leg system. As such, the inverter 120 also includes a neutral PWM output voltage $V_{invn}$. The PWM output voltages $V_{inva}$, $V_{invb}$, and $V_{invc}$ are input to filters 130 to provide sinusoidal supply voltages $V_{An}$, $V_{Bn}$, $V_{Cn}$ to the load 115. Such three-phase, 4-leg inverters may be used to maintain a desired sinusoidal output voltage waveform on each phase output over a desired range of loading conditions and transients. The power system 100 need not be configured as such a four-leg system but will be discussed in the context of such an architecture.

The power drive section 105 may also include a voltage sensing circuit 135. In power system 100, the voltage sensing circuit 135 includes a plurality of voltage dividers to monitor the magnitudes of supply voltages $V_{An}$, $V_{Bn}$, and $V_{Cn}$ with respect to $V_n$. The divided voltage signals are provided to respective low-pass filters 137 and, therefrom, to the control system 110. In this example, the voltage dividers include series connected resistors for each phase, but may also include other components and/or be constructed using different types of voltage divider architectures.

Figure 2:
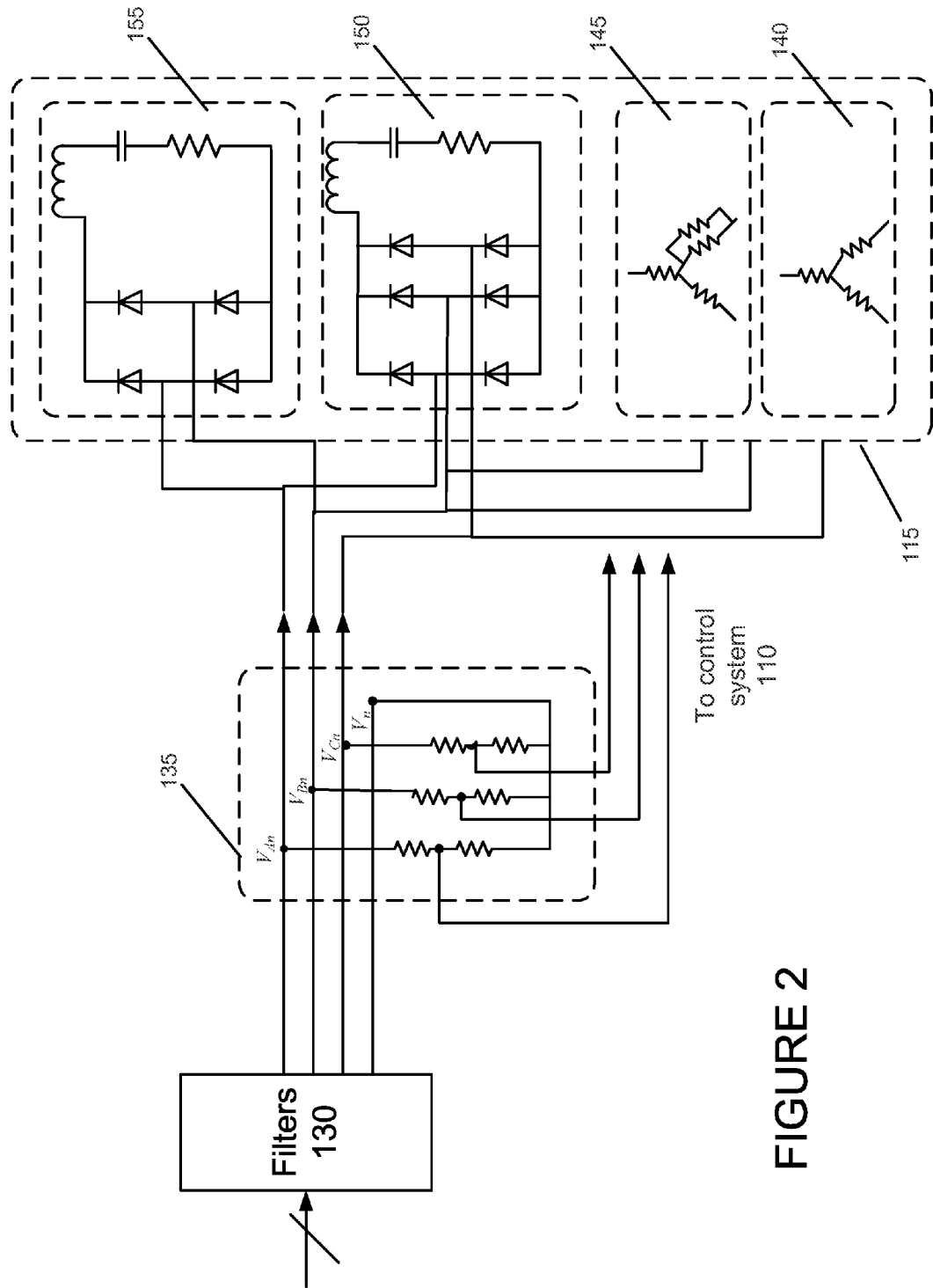
FIG. 2 is a schematic diagram showing various types of loads that may be supplied by the power system of FIG. 1.

FIG. 2 schematically illustrates various types of loads that may be supplied by the power system 100. Load 115 may include a single load type or multiple load types. Such load types may include one or more of 1) a three-phase balanced linear load 140, 2) a three-phase unbalanced linear load 145, 3) a three-phase balanced nonlinear load 150, and 4) a three phase unbalanced nonlinear load 155. Power system 100, for example, may provide supply voltages on a power bus, which is connected to one or more of the foregoing load types. The power drive section 105 is configured to provide phase voltages to such loads at a fundamental frequency.

Example of Control System

The control system 110 includes a plurality of sequence channels that are used in conjunction with other components of the control system. With respect to the sequence channels, the control system 110 includes a positive sequence channel 195 having a first positive sequence sub-channel (not shown in FIG. 1) configured to process d-axis components of a positive sequence error signal to generate corresponding positive sequence d-axis control signals. The positive sequence channel 195 also includes a second positive sequence sub-channel (not shown in FIG. 1) configured to process q-axis components of the positive sequence error signal to generate corresponding positive sequence q-axis control signals.

A negative sequence channel 200 includes a first negative sequence sub-channel (not shown in FIG. 1) configured to process d-axis components of a negative sequence error signal to generate corresponding negative sequence d-axis control signals. The negative sequence channel 200 also includes a second negative sequence sub-channel (not shown in FIG. 1) configured to process q-axis components of the negative sequence error signal to generate corresponding negative sequence q-axis control signals;

A zero sequence channel 205 includes a first zero sequence sub-channel (not shown in FIG. 1) configured to process d-axis components of a zero sequence error signal to generate corresponding positive sequence d-axis control signals. The zero sequence channel further includes a second zero sequence sub-channel (not shown in FIG. 1) configured to process q-axis components of the zero sequence error signal to generate corresponding zero sequence q-axis control signals.

Figure 4:
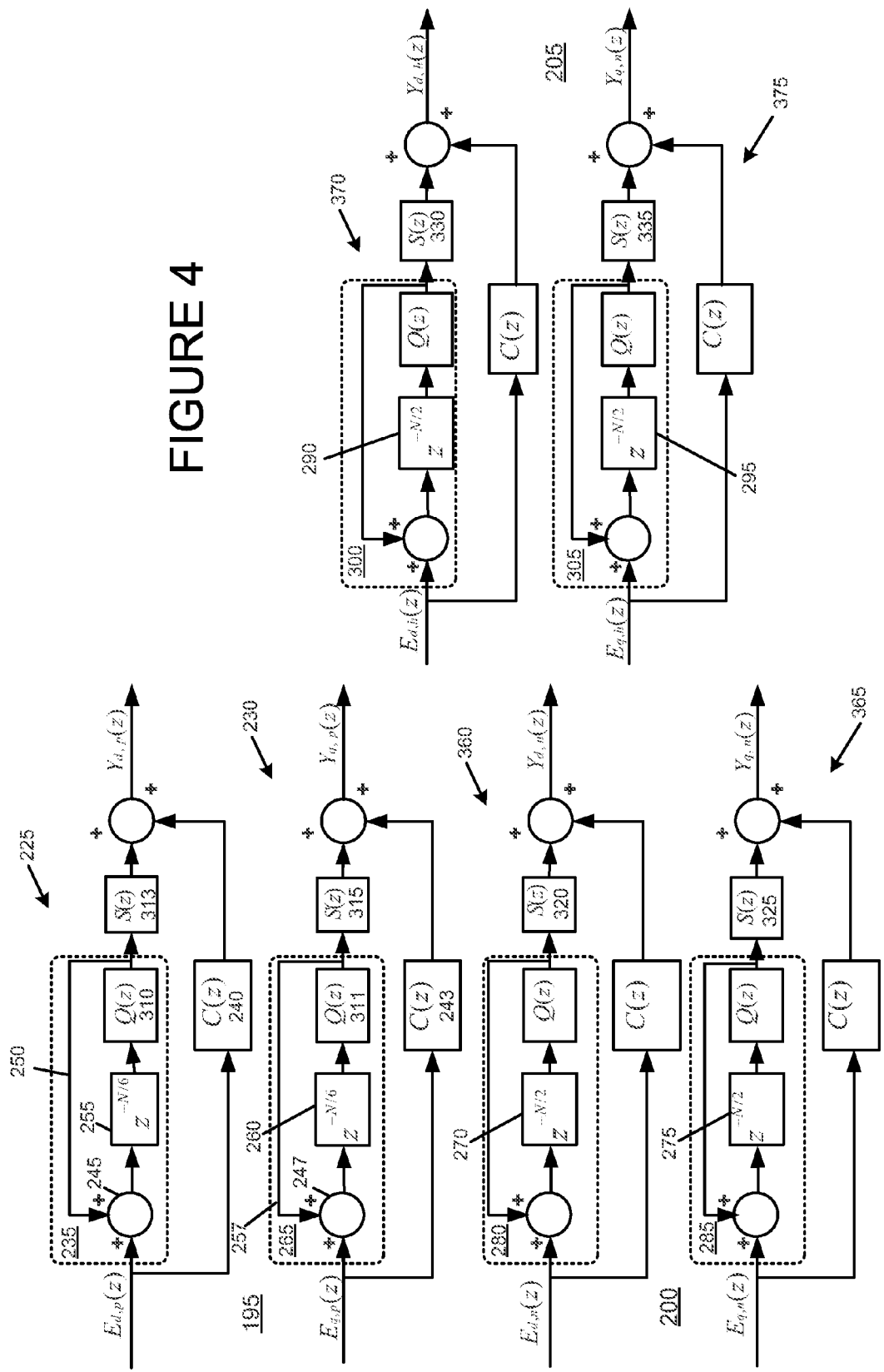
FIG. 4 is an algorithmic block diagram of the sequence channels used in FIG. 1.

As shown in FIG. 4, each sub-channel of the positive sequence channel 195, the negative sequence channel 200, and the zero sequence channel 205 includes at least one respective harmonic repetitive controller, and at least one respective repetitive controller compensator. Each sequence channel further includes at least one respective fundamental frequency controller configured to operate in parallel with the at least one respective harmonic repetitive controller and the at least one respective repetitive controller compensator.

Referring again to FIG. 1, the control system 110 is coupled to receive voltage signals from the voltage sensing circuit 135 at analog-to-digital converter 165. The analog-to-digital converter 165 converts the received voltage signals to digital signals $V_{an}$, $V_{bn}$, and $V_{cn}$. The digital signals $V_{an}$, $V_{bn}$, and $V_{cn}$ are provided to the input of a sequence decomposer 170, which decomposes $V_{an}$, $V_{bn}$, and $V_{cn}$ into positive sequence components $V_{abc,p}$, negative sequence components $V_{abc,n}$, and zero sequence components $V_{abc,h}$. The sequence decomposer 170 also provides a signal $V^*_{abc,h}$ corresponding to a quarter cycle delay of $V_{abc,h}$.

In the sequence decomposition, a vector ($\overline{V}_{an}$, $\overline{V}_{bn}$, $\overline{V}_{cn}$) corresponding to the three-phase voltage vector is decomposed into positive, negative, and zero sequence vectors. A general example of how sequence decomposition may be executed in the power system 100 may be understood with respect to the following equations:

$$\begin{bmatrix} \overline{V}_{an} \\ \overline{V}_{bn} \\ \overline{V}_{cn} \end{bmatrix} = \begin{bmatrix} \overline{V}_{an,p} + \overline{V}_{an,n} + \overline{V}_{an,h} \\ \overline{V}_{bn,p} + \overline{V}_{bn,n} + \overline{V}_{bn,h} \\ \overline{V}_{cn,p} + \overline{V}_{cn,n} + \overline{V}_{cn,h} \end{bmatrix}$$

where ($\overline{V}_{an,p}$, $\overline{V}_{bn,p}$, $\overline{V}_{cn,p}$) is the positive sequence vector for the three-phase voltage, ($\overline{V}_{an,n}$, $\overline{V}_{bn,n}$, $\overline{V}_{cn,n}$) is the negative sequence vector, and ($\overline{V}_{an,h}$, $\overline{V}_{bn,h}$, $\overline{V}_{cn,h}$) is the zero sequence vector.

The positive sequence ($\overline{V}_{an,p}$, $\overline{V}_{bn,p}$, $\overline{V}_{cn,p}$), negative sequence ($\overline{V}_{an,n}$, $\overline{V}_{bn,n}$, $\overline{V}_{cn,n}$), and zero sequences ($\overline{V}_{an,h}$, $\overline{V}_{bn,h}$, $\overline{V}_{cn,h}$) may be obtained using the following equations:

$$\begin{bmatrix} \overline{V}_{an,p} \\ \overline{V}_{bn,p} \\ \overline{V}_{cn,p} \end{bmatrix} = \text{Re}\left\{ \frac{1}{3}\begin{bmatrix} 1 & a & a^2 \\ a^2 & 1 & a \\ a & a^2 & 1 \end{bmatrix}\begin{bmatrix} \overline{V}_{an} \\ \overline{V}_{bn} \\ \overline{V}_{cn} \end{bmatrix} \right\} = \text{Re}\left\{ F_p \begin{bmatrix} \overline{V}_{an} \\ \overline{V}_{bn} \\ \overline{V}_{cn} \end{bmatrix} \right\} = F_p * \begin{bmatrix} V_{an} \\ V_{bn} \\ V_{cn} \end{bmatrix}$$

$$\begin{bmatrix} \overline{V}_{an,n} \\ \overline{V}_{bn,n} \\ \overline{V}_{cn,n} \end{bmatrix} = \text{Re}\left\{ \frac{1}{3}\begin{bmatrix} 1 & a^2 & a \\ a & 1 & a^2 \\ a^2 & a & 1 \end{bmatrix}\begin{bmatrix} \overline{V}_{an} \\ \overline{V}_{bn} \\ \overline{V}_{cn} \end{bmatrix} \right\} = \text{Re}\left\{ F_n \begin{bmatrix} \overline{V}_{an} \\ \overline{V}_{bn} \\ \overline{V}_{cn} \end{bmatrix} \right\} = F_n * \begin{bmatrix} V_{an} \\ V_{bn} \\ V_{cn} \end{bmatrix}$$

$$\begin{bmatrix} V_{an,h} \\ V_{bn,h} \\ V_{cn,h} \end{bmatrix} = \text{Re}\left\{ \frac{1}{3}\begin{bmatrix} 1 & 1 & 1 \\ 1 & 1 & 1 \\ 1 & 1 & 1 \end{bmatrix}\begin{bmatrix} \overline{V}_{an} \\ \overline{V}_{bn} \\ \overline{V}_{cn} \end{bmatrix} \right\} = \text{Re}\left\{ F_h \begin{bmatrix} \overline{V}_{an} \\ \overline{V}_{bn} \\ \overline{V}_{cn} \end{bmatrix} \right\} = F_h * \begin{bmatrix} V_{an} \\ V_{bn} \\ V_{cn} \end{bmatrix}$$

where $a = e^{j2\pi/3}$.

Assuming $V_{abcn} = V_{abcn_{max}} \cos(\omega t + \phi_{abc})$, then $\overline{V}_{abcn} = V_{abcn_{max}}[\cos(\omega t + \phi_{abcn}) + j \times \sin(\omega t + \phi_{abcn})]$.

Figure 3:
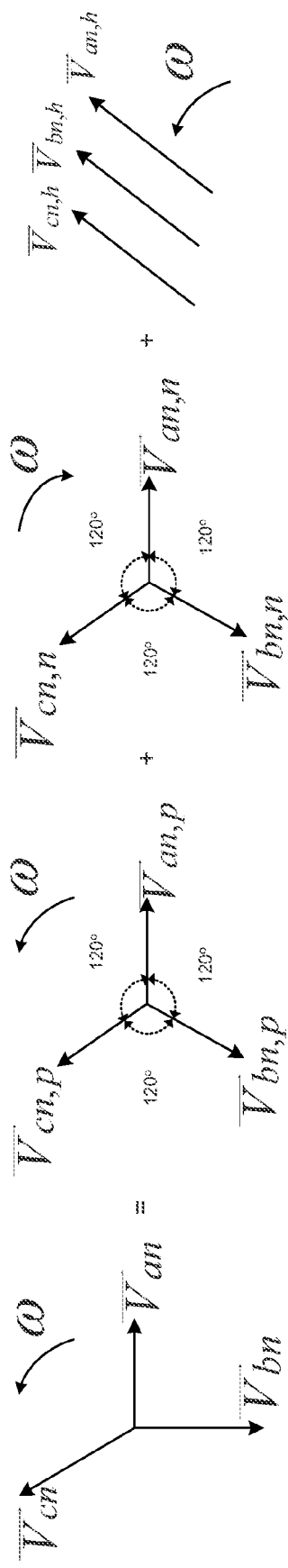
FIG. 3 is a graphical illustration of sequence decomposition.

Sequence decomposition is illustrated in graphical form in FIG. 3. As shown, the positive sequence vectors $\overline{V}_{an,p}$, $\overline{V}_{bn,p}$, $\overline{V}_{cn,p}$, the negative sequence vectors $\overline{V}_{an,n}$, $\overline{V}_{bn,n}$, $\overline{V}_{cn,n}$, and the zero sequence vectors $\overline{V}_{an,h}$, $\overline{V}_{bn,h}$, $\overline{V}_{cn,h}$ may be added to one another to obtain the original three-phase vectors $\overline{V}_{an}$, $\overline{V}_{bn}$, $\overline{V}_{cn}$.

With reference again to FIG. 1, the positive, negative, and zero sequence signals from the sequence decomposer 170 undergo respective abc-to-dq transformations. The positive sequence signals $\overline{V}_{an,p}$, $\overline{V}_{bn,p}$, $\overline{V}_{cn,p}$, shown collectively as $V_{abc,p}$ in FIG. 1 are provided to abc-to-dq transformer 173. The negative sequence signals $\overline{V}_{an,n}$, $\overline{V}_{bn,n}$, $\overline{V}_{cn,n}$, shown collectively as $V_{abcn,n}$, are provided from sequence decomposer 170 to abc-to-dq transformer 175. An abc-to-dq transformation is executed by abc-to-dq transformer 180 on the zero sequence signals $\overline{V}_{an,h}$, $\overline{V}_{bn,h}$, $\overline{V}_{cn,h}$ received from sequence decomposer 170. The abc-to-dq transformers 173, 175 and 180 are configured to use angular frequency values $\omega$ and $-\omega$, to determine the values for G in their transformations.

The abc-to-dq transformers 173, 175, and 180 execute a direct-quadrature (dq) transformation whereby a mathematical transformation is used to simplify the analysis of the three-phase circuit. Application of the dq transform reduces each of the three AC quantities $V_{an}$, $V_{bn}$, and $V_{cn}$ to two DC quantities. Simplified calculations can then be carried out on these DC quantities before performing the inverse transform to recover the processed three-phase AC results. As such, dq transformation operations may simplify calculations executed by subsequent signal processing stages.

One example of a dq transform as applied to a three-phase voltage is shown here in matrix form:

$$V_{dq} = TV_{abc} = \sqrt{\frac{2}{3}} \begin{bmatrix} \cos(\theta) & \cos\left(\theta - \frac{2\pi}{3}\right) & \cos\left(\theta + \frac{2\pi}{3}\right) \\ -\sin(\theta) & -\sin\left(\theta - \frac{2\pi}{3}\right) & -\sin\left(\theta + \frac{2\pi}{3}\right) \\ \frac{\sqrt{2}}{2} & \frac{\sqrt{2}}{2} & \frac{\sqrt{2}}{2} \end{bmatrix} \begin{bmatrix} V_a \\ V_b \\ V_c \end{bmatrix}$$

where $\theta = \omega * t$. The inverse transformation operations used in the dq-to-abc transformer 210 takes place in accordance with the following matrix equation:

$$V_{abcn} = T^{-1}V_{dq0} = \sqrt{\frac{2}{3}} \begin{bmatrix} \cos(\theta) & -\sin(\theta) & \frac{\sqrt{2}}{2} \\ \cos\left(\theta - \frac{2\pi}{3}\right) & -\sin\left(\theta - \frac{2\pi}{3}\right) & \frac{\sqrt{2}}{2} \\ \cos\left(\theta + \frac{2\pi}{3}\right) & -\sin\left(\theta + \frac{2\pi}{3}\right) & \frac{\sqrt{2}}{2} \end{bmatrix} \begin{bmatrix} V_d \\ V_q \\ V_o \end{bmatrix}$$

where $\theta = \omega * t$.

A plurality of individual sequence channels are configured to receive the dq signals from their respective abc-to-dq transformers. In control system 110, positive sequence signals $V_{din,p}$ and $V_{qin,p}$ are provided to the positive sequence channel 195 for processing, negative sequence signals $V_{din,n}$ and $V_{qin,n}$ are provided to the negative sequence channel 200 for processing, and zero sequence signals $V_{din,h}$ and $V_{qin,h}$ are provided to the zero sequence channel 205 for processing. The positive sequence channel 195, the negative sequence channel 200, and the zero sequence channel 205 have the same algorithmic processing structures, but use different processing parameters depending on whether the channel processes positive, negative, or zero sequence signals. As will be explained in further detail below, using different processing parameters in this manner reduces the total harmonic distortion of the power system outputs to load 115 and provides high dynamic response.

Error signals are used in the processes executed by the positive sequence channel 195, the negative sequence channel 200, and the zero sequence channel 205. These sequence error signals correspond to positive, negative, and zero sequences of the phase voltages. For example, the error signal $E_{d,p}(z)$ shown in FIG. 4 is generated for use by positive sequence channel 195 based on a comparison between $V_{din,p}$ and $V_{dref,p}$, where $V_{dref,p}$ is a signal supplied to the positive sequence channel as part of the $V_{refs,p}$ shown in FIG. 1. Another error signal $E_{q,p}(z)$ (FIG. 4) is generated for use by positive sequence channel 195 based on a comparison between $V_{qin,p}$ and $V_{qref,p}$, where $V_{qref,p}$ is another signal supplied to the positive sequence channel in $V_{refs,p}$. Similar operations are used to obtain error signals used in the processing operations executed by negative sequence channel 200 and zero sequence channel 205. It is noted that, although the reference signals are shown in FIG. 1 as inputs for error processing within each sequence channel, the error signals may be generated external to the sequence channels in other processing operations and provided as inputs to the sequence channels.

Each of the sequence channels provides respective dq signals for processing by a dq-to-abc transformer 210. The dq-to-abc transformation is an inverse transform of the transformation process executed by the abc-to-dq transformers 173, 175, and 180. In control system 110, control signals $Y_{d,p}(z)$ and $Y_{q,p}(z)$ are provided at the output of positive sequence channel 195, control signals $Y_{d,n}(z)$ and $Y_{q,n}(z)$ are provided at the output of the negative sequence channel 200, and control signals $Y_{d,h}(z)$ and $Y_{q,h}(z)$ are provided at the output of the zero sequence channel. These control signals are provided as a result of the processing operations of the sequence channels shown in FIG. 4.

The control signals are provided to the dq-to-abc transformer 210. The signal $Y_{abc,p}(z)$ corresponds to the transformation executed on control signals $Y_{d,p}(z)$ and $Y_{q,p}(z)$. The signal $V_{abc,n}(z)$ corresponds to the transformation executed on control signals $Y_{d,n}(z)$ and $Y_{q,n}(z)$. The signal $Y_{abc,h}(z)$ corresponds to the transformation executed on control signals $Y_{d,h}(z)$ and $Y_{q,h}(z)$. The $Y_{abc,p}(z)$, $Y_{abc,n}(z)$, and $Y_{abc,h}(z)$ signals are added together by combiner 215 to provide a composite signal $Y_{abc}(z)$. An over modulation processor 220 executes an over modulation technique on $Y_{abc}(z)$. The resulting signals are provided to a carrier processor 227, which provides its output to PWM controller 233 to generate PWM control signals to gate drivers 234.

FIG. 4 is a block diagram of the processing operations executed by the sequence channels. Each sequence channel includes two sub-channels, one associated with the d-axis component of the error signal of the respective sequence channel, and another associated with the q-axis component of the error signal of the respective sequence channel. Each sub-channel executes its processing using an error signal $E_{d,x}(z)$ representing the error signal generated using $V_{din,x}$, and another signal $E_{q,x}(z)$ representing the error signal generated using $V_{qin,x}$, where x=n, p, or h depending on the sequence vector.

Most of the following discussion regarding FIG. 4 is directed to the processing architecture of the positive and negative sequence channels. However, this architecture is also applicable to the zero sequence channel.

In the processing architecture of FIG. 4, a first sub-channel 225 processes the $E_{d,p}$ error signals of the positive sequence, and a second sub-channel 230 processes the $E_{q,p}$ error signals of the positive sequence. These positive sequence error signals correspond to positive sequences of the phase voltages. Each sub-channel 225 and 230 includes a respective harmonic repetitive controller 235, 265, and fundamental frequency controller 240, 243. In this regard, the error signals $E_{d,p}$ are processed in the first sub-channel 225 by harmonic repetitive controller 235 and fundamental frequency controller 240. The error signals $E_{q,p}$ are processed in the second sub-channel 230 by harmonic repetitive controller 265 and fundamental frequency controller 243. Harmonic repetitive controller 235 includes a combiner 245 receiving the error signals $E_{d,p}(z)$ and a feedback signal 250. Harmonic repetitive controller 265 includes a combiner 247 receiving the error signals $E_{q,p}(z)$ and a feedback signal 257.

The output of the combiner 245 is provided to a phase delay processor 255. The phase delay processors of all sequence channels are of the form $z^{-N/i}$. The phase delay processor 255 processes the output of combiner 245 using a value i=6, making repetitive controller 235 a 6th order harmonic repetitive controller, since they are intended to generate a high gain at multiples of the 6th harmonic of the fundamental frequency. Likewise, the phase delay processor 260 of the repetitive controller 265 of the second sub-channel 230 uses a value i=6. However, the phase delay processors 270 and 275 of the harmonic repetitive controllers 280 and 285 of the negative sequence channel 200 use a value of i=2, making them second order harmonic repetitive controllers Likewise, the phase delay controllers 290 and 295 of the harmonic repetitive controllers 300 and 305 of the zero sequence channel 205 use a value of i=2, also making them second order harmonic repetitive controllers. In the negative and zero sequences, the harmonic repetitive controllers 280, 285, 300, and 305 are intended to generate a high gain at multiples of the 2nd harmonics of the fundamental frequency, which corresponds to the value i=2.

The output of the phase delay processor 255 is provided to the input of a low-pass filter or a gain that is smaller than unity 310. Here, has a gain of about 0.95.

All of the harmonic repetitive controllers shown in FIG. 4 have the same basic processing elements shown in sub-channels 225 and 230 of the positive sequence channel 195, as well as the processing block shown the transfer function Q(z).

The output signal of Q(z) 310 is also provided to the input of a repetitive controller compensator 313. Repetitive controller compensator 313 has a transfer function of S(z) to enhance stability of the sub-channel 225. The transfer function S(z) is comprised of a high pass filter $F_{high}(z)$, a zero-phase-shift notch-filter $F_{notch}(z)$, and a low-pass filter $F_{low}(z)$. All of the repetitive controller compensators 313, 315, 320, 325, 330, and 335 use the same general variables for the transfer functions, but use different parameters for those variables depending on whether the repetitive controller compensator processes the positive sequence, negative sequence, or zero sequence. The general form of each filter $F_{high}(z)$, $F_{notch}(z)$, and $F_{low}(z)$ is:

$$F_{high}(z) = \frac{k_h(z-1)}{z-p_h}$$

$$F_{notch}(z) = \frac{z^{2n} + 2z^n + 1}{4z^{2n}}$$

$$F_{low}(z) = \frac{k_l(z-z_1)}{(z-p_{l1})(z-p_{l2})}$$

In this example, one or more of the filters $F_{high}(z)$, $F_{notch}(z)$, and $F_{low}(z)$ of each sub channel of the positive sequence channel 195 and the corresponding filters $F_{high}(z)$, $F_{notch}(z)$, and $F_{low}(z)$ of each sub-channel of the negative sequence channel 200 use the same parameters for S(z). However, one or more of the filters $F_{high}(z)$, $F_{notch}(z)$, and $F_{low}(z)$ of the sub-channels of the zero sequence channel 205 use at least one or more parameters that differ from those used in the sub-channels of the positive sequence channel 195 and negative sequence channel 200.

The transfer function $F_{high}(z)$ has a pole $p_h$ that defines the cross-over frequency of the high-pass filter. In a 400 Hz system, the cross-over frequency for all of the high pass filters may be selected at 600 Hz to compensate for the gains brought by the harmonic repetitive controllers in the low frequency range (less than about 400 Hz). However, pole $p_h$ is defined so as not to affect the performance of the respective harmonic repetitive control in the high frequency range (greater than about 400 Hz). The value for the proportional gain $k_h$ is selected based on the gain of the respective harmonic repetitive controller in the low frequency range.

The transfer function $F_{low}(z)$ comprises a gain $k_l$ and zero $z_l$, which are selected to provide unity gain and zero phase delay in a low frequency range. The two poles $p_{l1}$ and $p_{l2}$ are selected to provide fast damping in the high frequency range, and to provide a cross-over frequency in a range, for example, of about ⅕ to ⅓ of the switching frequency of the inverter 120. Assuming a switching frequency of the semiconductor devices of the inverter 120 to be about 19.2 kHz, the crossover frequency may be, for example, around 6 kHz. In the control system 110, signals above 6 kHz are generally not used and, to the contrary, may degrade the performance as noise. This is the case when, for example, the LC filters 130 of the power drive section 105 have a cut-off frequency around 3-4 kHz, or another frequency corresponding to about ¹⁄₁₀ to about ⅕ of the switching frequency of the inverter 120.

The transfer function $F_{notch}(z)$ is a zero-phase-delay notch filter that is configured to provide a notch effect around the corner-frequency of the power drive section 105 brought about, for example, by the characteristics of the low-pass filters 130 (e.g., LC filters), the switching frequency of the inverter 120, and any filter affects resulting from parasitic circuit elements. Different values for n result in a notch effect that occurs around different frequencies. Since the corner-frequencies of the power drive section 105 in the positive and negative sequence are the same, the same notch filter parameters are used for both sequences. For example, the transfer functions $F_{notch}(z)$ of the sub-channels in the positive sequence channel 195 and negative sequence channel 200 may use a value of n=3. However, the corner-frequency of the power drive section 105 in the zero sequence differs from that of the corner-frequency in the positive and negative sequence and, as such, has a different value for n. For example, the transfer function $F_{notch}(z)$ of the sub-channels in the zero sequence channel 205 may use a value of n=11.

In addition to being provided to the input of the respective harmonic repetitive controller, each error signal is provided to the input of a respective fundamental frequency controller having a transfer function C(z) that is selected to control the fundamental frequency component (i.e., 400 Hz) contained in the error signal. The transfer function C(z) of all of the sub-channels 225, 230, 360, 365, 370, and 375 have the same basic processing elements. As previously noted, although the corner-frequency of the power drive section 105 is the same with respect to the positive and negative sequences, it differs from the zero sequence. So at least one or more of the parameters used for C(z) in the sub-channels 225, 230, 360, and 365 are different from one or more of the parameters used in the sub-channels 370 and 375. Consequently, the sub-channels may be configured to use different parameters for C(z) depending on whether the corresponding sub-channel is configured to process positive, negative, or zero sequences.

The fundamental frequency controllers may be implemented as two-pole controller designed for the fundamental frequency (e.g., 400 Hz). An example of such a general transfer function is:

$$C(z) = \frac{k_c(z - z_c)}{(z - 1)(z - p_c)}$$

The two-pole controller has poles at z=1 and z=$p_c$. The value for $p_c$ for the positive and negative sequence channels is selected to occur below the overshoot frequency of system (e.g. the overshoot caused by filters 130 as well as undesired filter characteristics of the system) thereby providing a high degree of damping and ensuring a high magnitude margin. The value for $p_c$ for the zero sequence channel is selected to occur above the overshoot frequency. The value for the zero $z_c$ is selected to obtain the desired phase margin. The value for $k_c$ is selected as a trade-off between system robustness and bandwidth (response speed).

Assuming the use of a sampling time of Ts=¹⁄₃₈₄₀₀ and a fundamental frequency of 400 Hz the parameters for C(z), used by the sub-channels of the positive sequence channel 195 and negative sequence channel 200 may be selected as $z_c$=0.0656, $p_c$=0.916, and $k_c$=0.0014. The parameters used by the sub-channels of the zero sequence channel 205 may be selected as $z_c$=0.3664, $p_c$=0.9498, and $k_c$=0.0006689. It will be recognized, however, that other parameters may be used in the transfer functions while maintaining the distinction between the zero sequence channel and the positive and negative sequence channels.

The bode plot for each of the harmonic repetitive controllers 235 and 265, of the sub-channels of the positive sequence channel 195 are shown in FIG. 5(a). In FIG. 5(a) there is a substantial low-frequency component below the fundamental frequency of 400 Hz. At the fundamental frequency, the magnitude of the response is approximately 0 dB, after which the response has peaks above 20 dB at the integer multiples of the 6th harmonic (6th, 12th, 18th, etc. harmonics).

FIG. 5(b) is an example of a bode plot of S(z) of the repetitive controller compensators 313 and 315 of the positive sequence channel 195, and the repetitive controller compensators 320 and 325 of the negative sequence channel 200. In this example, the transfer functions S(z) for both the positive sequence channel 195 and negative sequence channel 200 have a low-frequency range response that compensates for the low-frequency response of the harmonic repetitive controllers in the respective sequence channels. Here, the low-frequency range response shown in FIG. 5(a) occurs below 400 Hz (fundamental frequency) and has a magnitude of about 25 dB. So, the low-frequency response of S(z) could start from any magnitude that compensates for this amplitude, such as a magnitude less than −25 dB. In the example, the magnitude of the low-frequency response of S(z) is approximately −75 dB.

The magnitude of the transfer function S(z) then increases so that it is approximately 0 dB at the fundamental frequency. Approximately at the corner-frequency of the power drive section 105 in the positive sequence and negative sequence, both of which are the same, the curve has a negative notch response. The magnitude of the negative peak of the notch response may be affected by several different factors, such as the sampling frequency used by the control system 110, the resolution of a digital controller implementing the control system 110, etc. In this example, the magnitude of the negative peak is approximately −300 dB with a phase angle of approximately 0°.

The bode plot of the two-pole filters C(z) of the sub-channels 225, 230, 360, and 365 used in each of the positive and negative sequence channels are illustrated in FIG. 5(c). As shown, the magnitude of the response goes from an initial high of 20 dB at low-frequencies to −20 dB at the fundamental frequency. The magnitude of the response continues to decrease at a higher rate for frequencies greater than the fundamental frequency. In the low-frequency region of the phase diagram, the phase angle is a positive phase angle of about 90° and gradually changes, ultimately reaching a negative phase angle of slightly less than −120° at the fundamental frequency.

Figure 6:
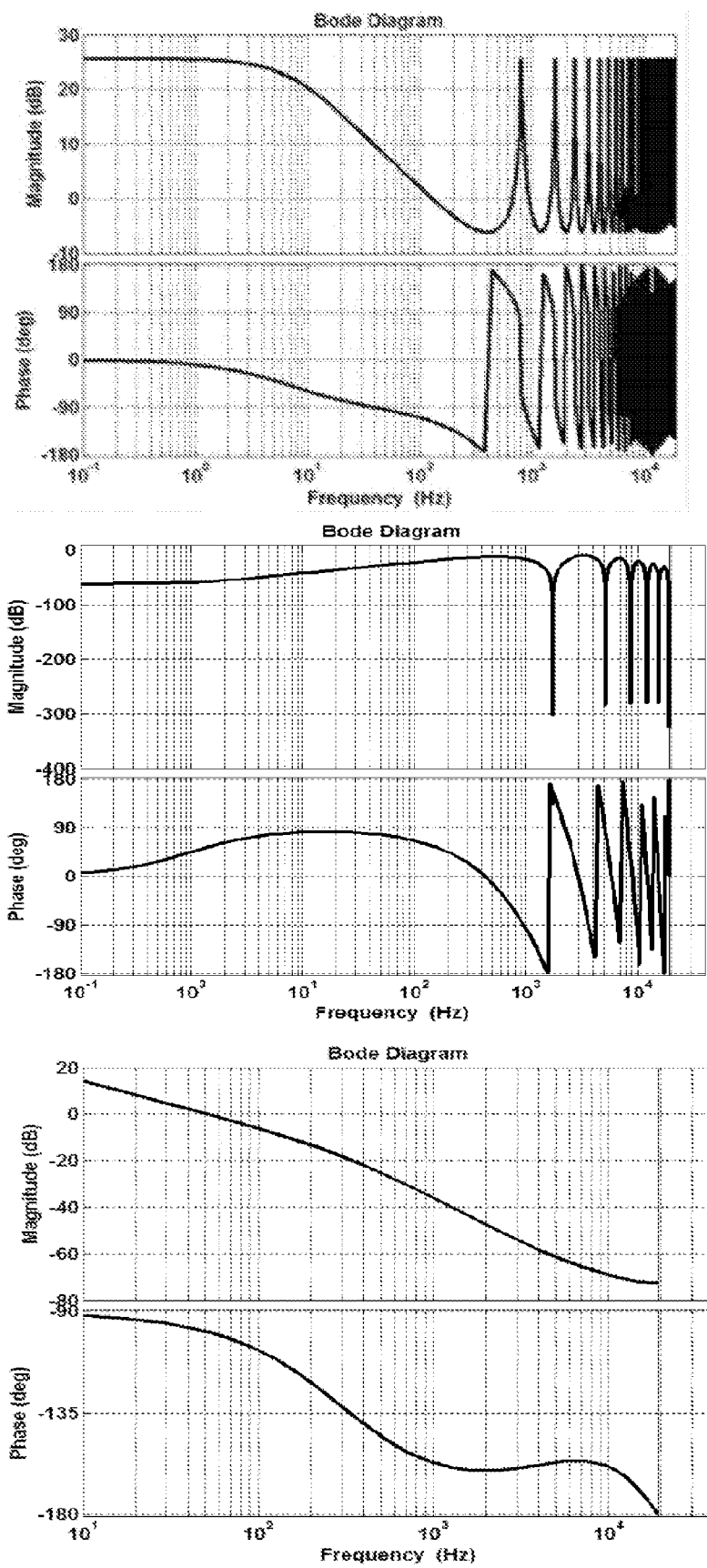
FIG. 6($a$) is an example of a bode plot having a response that may be used for each of the harmonic repetitive controllers of the negative sequence and zero sequence channel.

The bode plot for the harmonic repetitive controllers 280, 285, 300, and 305 of the sub-channels of the negative sequence channel 200 and zero sequence channel 205 are both the same and are shown in FIG. 6(a). Each harmonic controller has a low-frequency magnitude response of approximately 25 dB, which decreases to approximately −5 dB at the fundamental frequency. At frequencies higher than the fundamental frequency, the magnitude response peaks at approximately 25 dB at frequency intervals for the 2nd, 4th, 6th, etc. harmonic.

The bode plot for the transfer function S(z) of the harmonic controller compensators 330 and 335 of the sub-channels of the zero sequence channel 205 are shown in FIG. 6(b). Approximately at the corner-frequency of the power drive section 105 in the zero sequence, the curve has a negative notch response. The magnitude of the negative peak of the notch response may be affected by several different factors, such as the sampling frequency used by the control system 110, the resolution of a digital controller implementing the control system 110, etc. In this example, the magnitude of the negative peak is approximately −300 dB with a phase angle of approximately 0°.

The bode plot for each of the two-pole filters C(z) of the sub-channels 370 and 375 used in the zero sequence channel is shown in FIG. 6(c). As illustrated, the magnitude of the response goes from an initial high of approximately 20 dB at low-frequencies to −20 dB at the fundamental frequency. The magnitude of the response continues to decrease at a higher rate for frequencies greater than the fundamental frequency. In the low-frequency region of the phase diagram, the phase angle gradually changes from a phase angle of about −90° at lower frequencies, ultimately reaching a phase angle of approximately −135° at the fundamental frequency.

General Responses of a Power System to Different Load Conditions

Figure 7B:
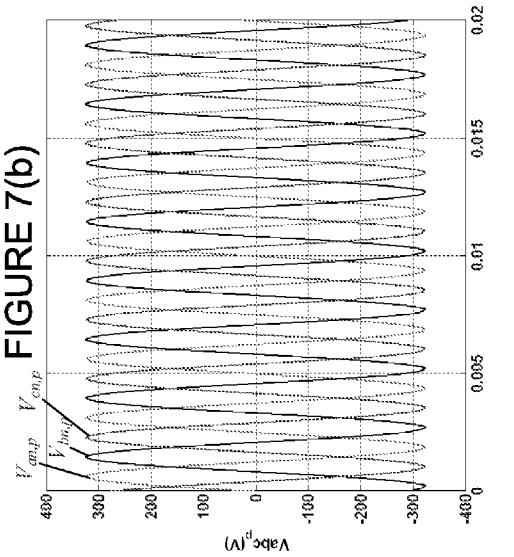
FIGS. 7(a) through 7(d) illustrate voltages, including decomposed voltages, occurring in the power supply when it provides power to a three-phase balanced linear load.
Figure 7A:
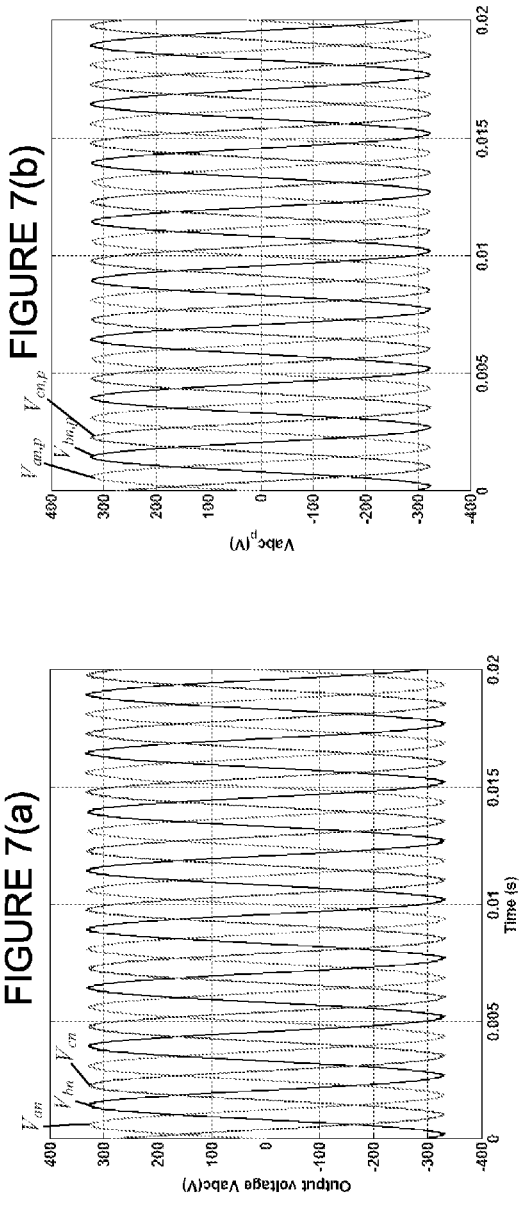
Figure 7C:
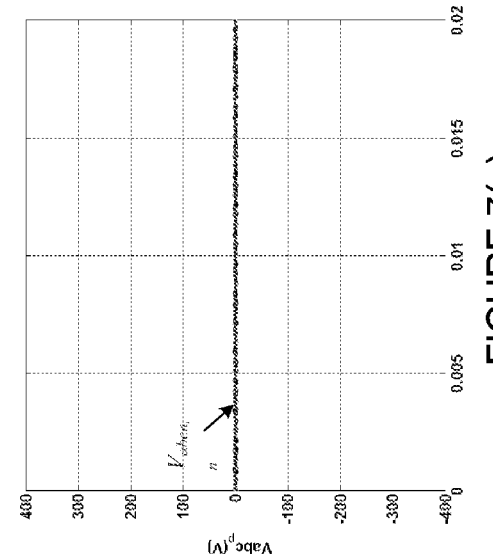
Figure 7D:
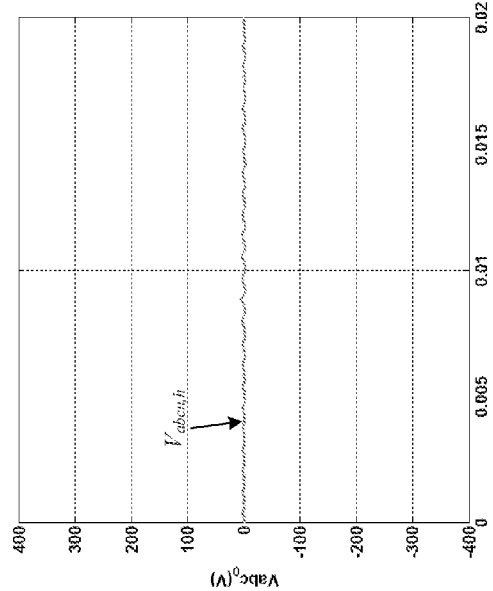

FIG. 7(a) illustrate voltages occurring at the output of a power system when it provides power to a three-phase balanced linear load. The waveforms $V_{abcn}$ corresponding to each phase voltage under such conditions are shown in FIG. 7(a). FIGS. 7(b) through 7(d) show the signals after the signal of FIG. 7(a) has been decomposed into positive sequences $V_{abcn,p}$, negative sequences $V_{abcn,n}$, and zero sequences $V_{abcn,h}$, respectively. As shown in FIG. 7(d), the zero sequence is only comprised of a single curve $V_{a,h}$ because the three signals $V_{abcn,h}$ in the zero sequence are in phase. Being in phase, only one curve can be observed.

Figure 8B:
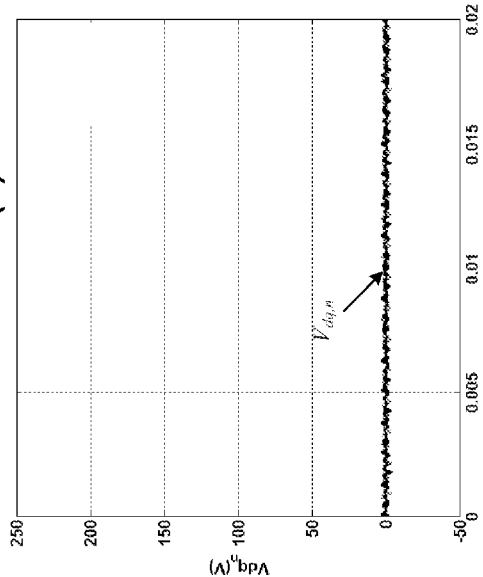
FIG. 8(a) through FIG. 8(c) illustrate the dq transformations of the signals shown in FIG. 7(b) through FIG. 7(d).
Figure 8A:
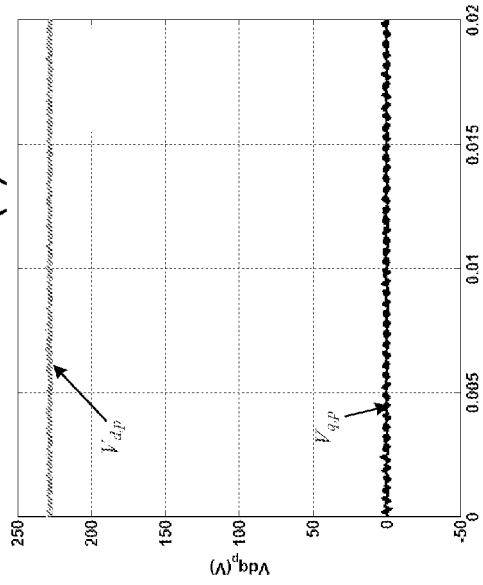
Figure 8C:
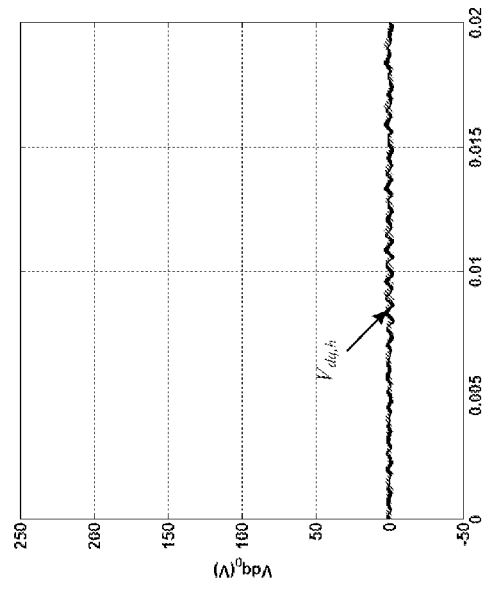

FIGS. 8(a) through 8(c) are the dq transformations of the signals shown in FIG. 7(b) through FIG. 7(d). Signals $V_{dq,n}$ in the negative sequence of FIG. 8(b) and signals $V_{dq,h}$ in the zero sequence of FIG. 8(c) are equal to zero.

Figure 9A:
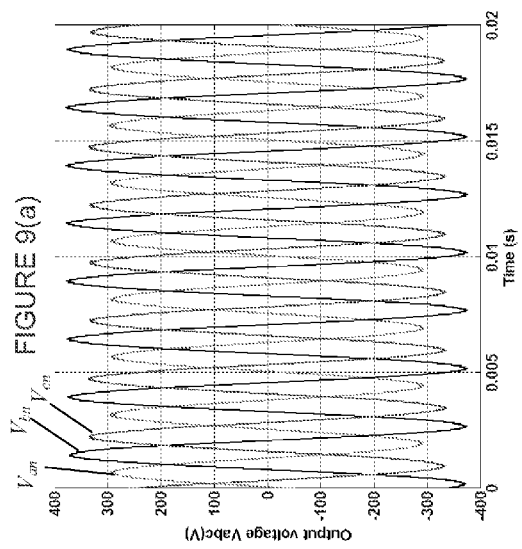
FIGS. 9(a) through 9(d) illustrate voltages, including decomposed voltages, occurring in the power supply when it provides power to a three-phase unbalanced linear load.
Figure 9B:
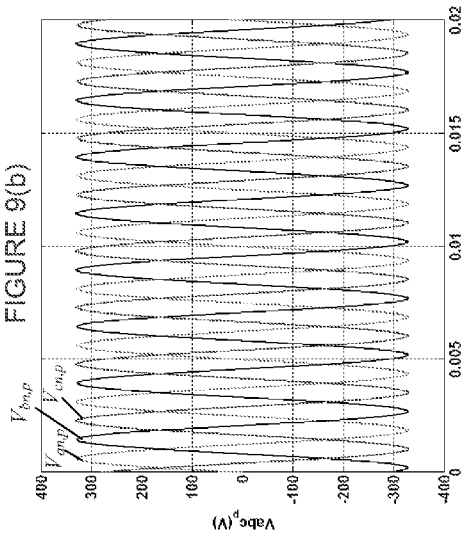
Figure 9C:
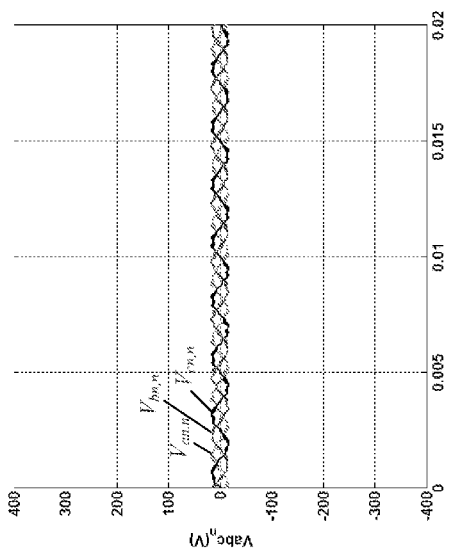
Figure 9D:
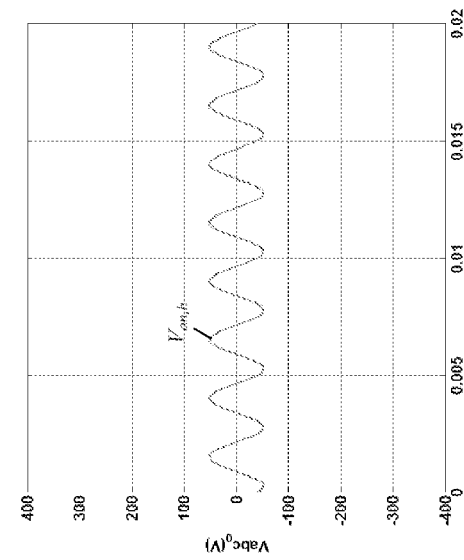

FIG. 9(a) illustrates voltages waveforms $V_{abcn}$ corresponding to each phase voltage at the output of a power system when it provides power to a three-phase unbalanced linear load. FIGS. 9(b) through 9(d) show the decomposed signals of the positive sequences $V_{abcn,p}$, negative sequences $V_{abcn,n}$, and zero sequences $V_{abcn,h}$, respectively. The decomposed signals each have a fundamental frequency component, but do not have harmonic components.

Figure 10B:
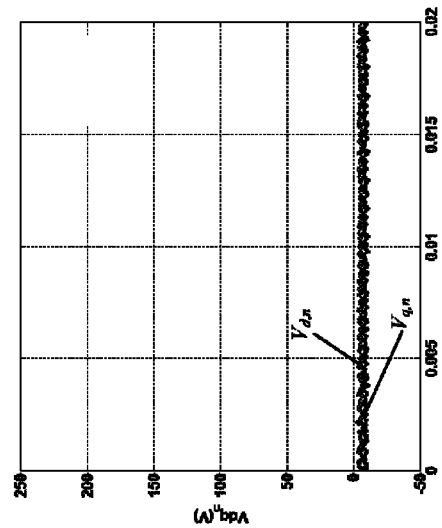
FIGS. 10(a) through 10(c) illustrate dq transformations of the signals shown in FIGS. 9(b) through 9(d).
Figure 10A:
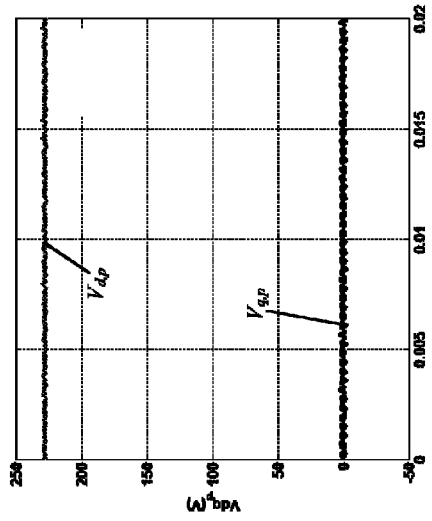
Figure 10C:
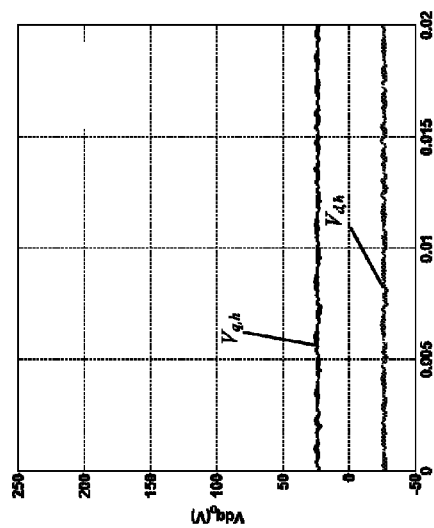

FIGS. 10(a) through 10(c) show dq transformations of the signals shown in FIGS. 9(b) through 9(d), respectively. As evident from the figures, none of the dq signals of the sequences contain harmonics.

Figure 11A:
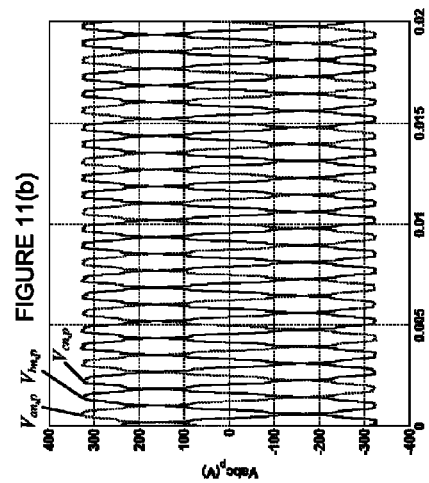
FIGS. 11(a) through 11(d) illustrate voltages, including decomposed voltages, occurring in the power supply when it provides power to a three-phase balanced non-linear load.
Figure 11B:
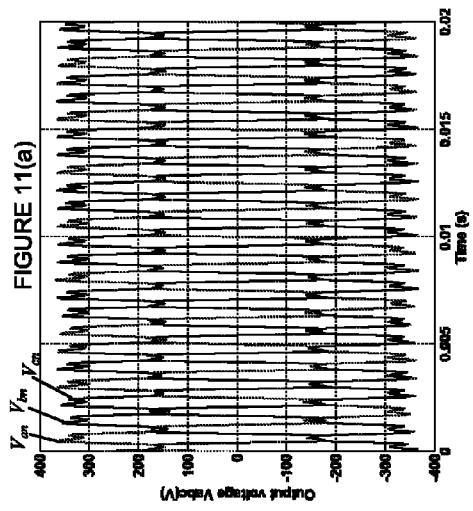
Figure 11C:
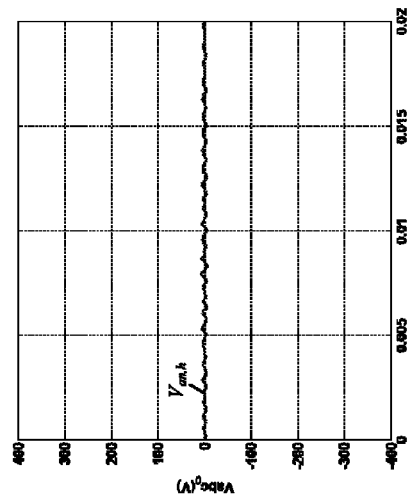
Figure 11D:
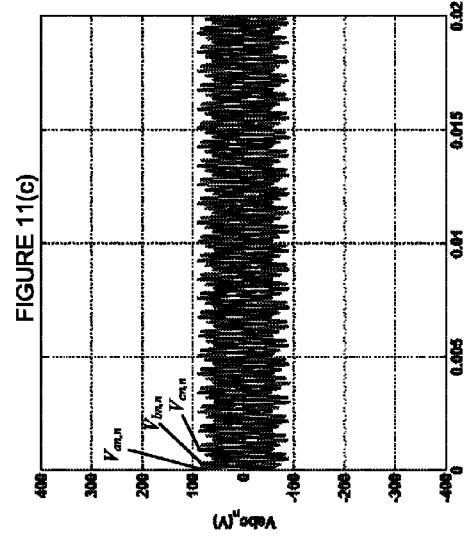

FIG. 11(a) illustrates voltages waveforms $V_{abcn}$ corresponding to each phase voltage occurring at the output of a power system when it provides power to a three-phase balanced nonlinear load. FIGS. 11(b) through 11(d) correspond to the signals shown in FIG. 11(a) after they have been decomposed into positive, negative, and zero sequences, respectively. In this case, signals in the positive sequence of 11(b) contain 7th, 13th, 19th, etc. harmonics along with fundamental frequency component. Signals in the negative sequences shown in FIG. 11(c) contain 5th, 11th, 17th, etc. harmonics. Signals in the zero sequence of FIG. 11(d) contain do not contain harmonics.

The dq transformations of the signals shown in FIG. 11(b) through FIG. 11(d) are shown in FIG. 12(a) through FIG. 12(c), respectively. In FIG. 12(a), the dq transformations of the positive sequence signals contain 6th, 12th, 18th, etc. harmonics. In FIG. 12(b), the dq transformation of the negative sequence signals contain 4th, 10th, 16th, etc. Harmonics. In FIG. 12(c), the dq transformation of the zero sequence signals do not contain harmonics.

Figure 13B:
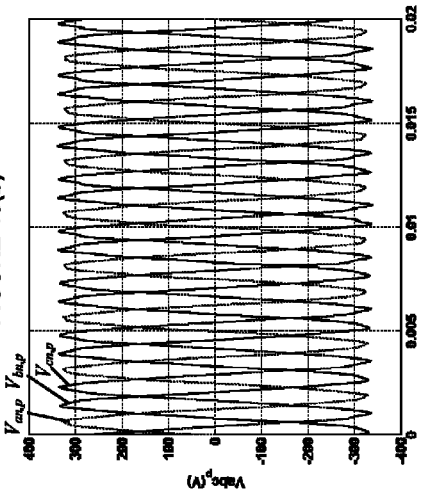
FIGS. 13(a) through 13(d) illustrate voltages, including decomposed voltages, occurring in the power supply when it provides power to a three-phase unbalanced non-linear load.
Figure 13D:
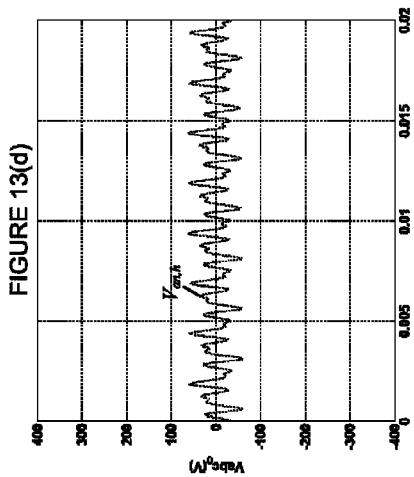
Figure 13A:
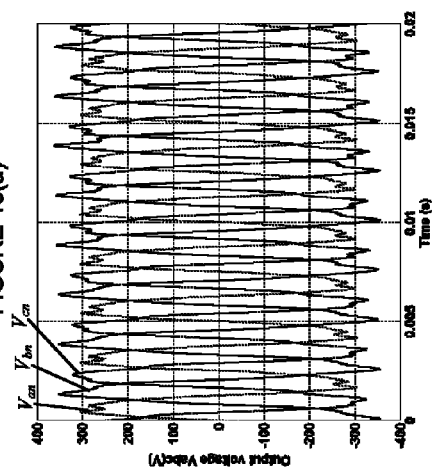
Figure 13C:
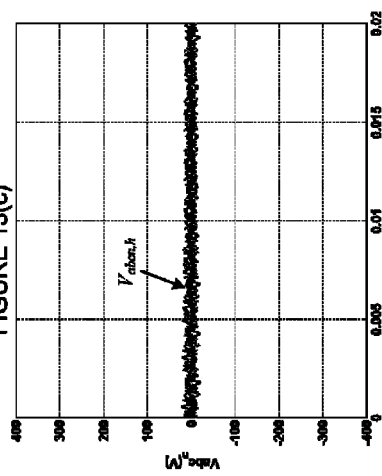

FIGS. 13(a) through 13(d) illustrate voltage waveforms $V_{abcn}$ corresponding to each phase voltage occurring at the output of a power system when it provides power to a three-phase unbalanced nonlinear load. FIGS. 13(b) through 13(d) correspond to the signals shown in FIG. 13(a) after they have been decomposed into positive, negative, and zero sequences, respectively. In this case, signals in the positive sequence of 13(b) contain 7th, 13th, 19th, etc. harmonics along with a fundamental frequency component. Signals in the negative sequence shown in FIG. 13(c) contain 5th, 11th, 17th, etc. harmonics. Signals in the zero sequence of FIG. 13(d) contain 3rd, 9th, 15th, etc. harmonics.

Figure 14A:
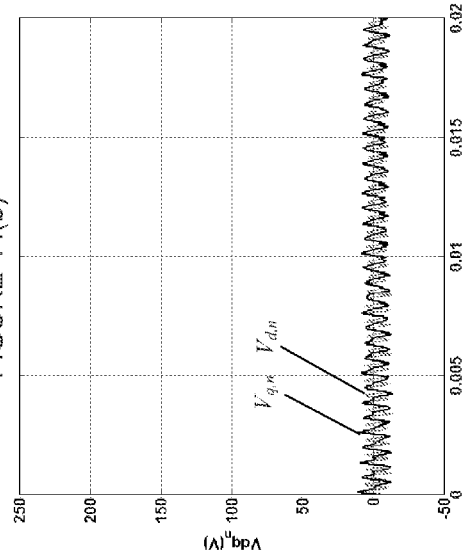
FIGS. 14(a) through 14(c) illustrate dq transformations of the signals shown in FIGS. 13(b) through 13(d).
Figure 14B:
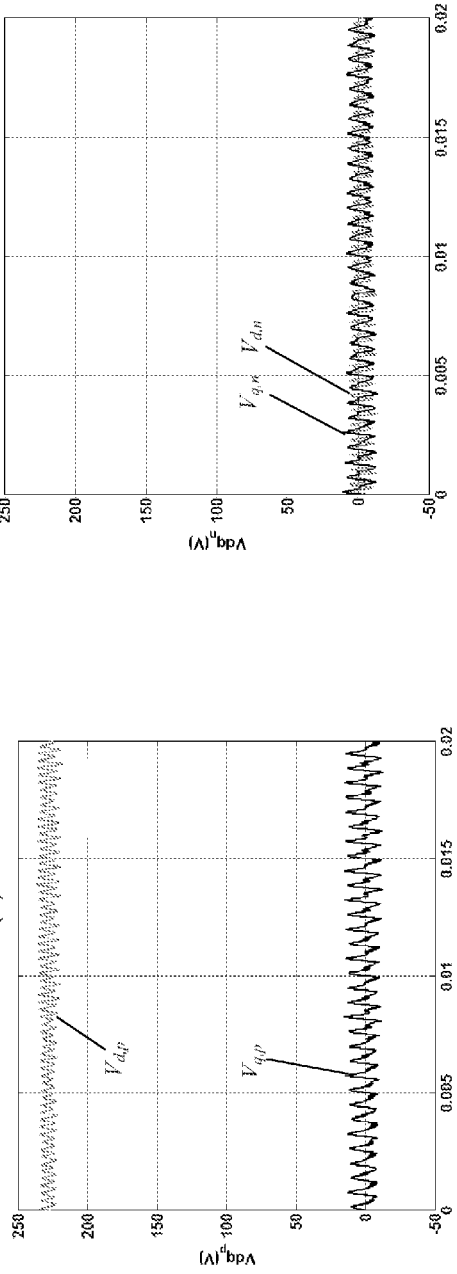
Figure 14C:
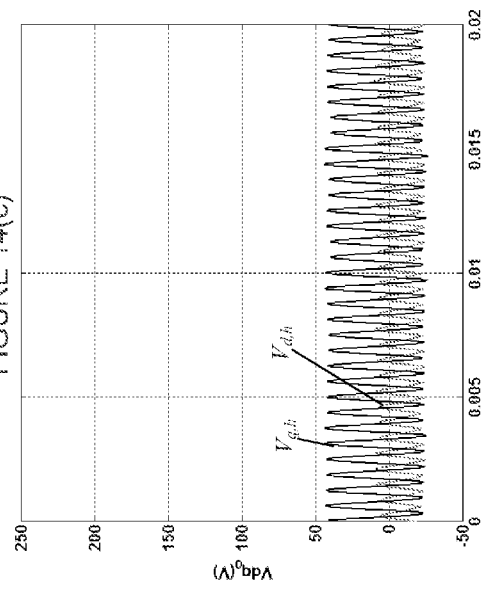
Figure 16:
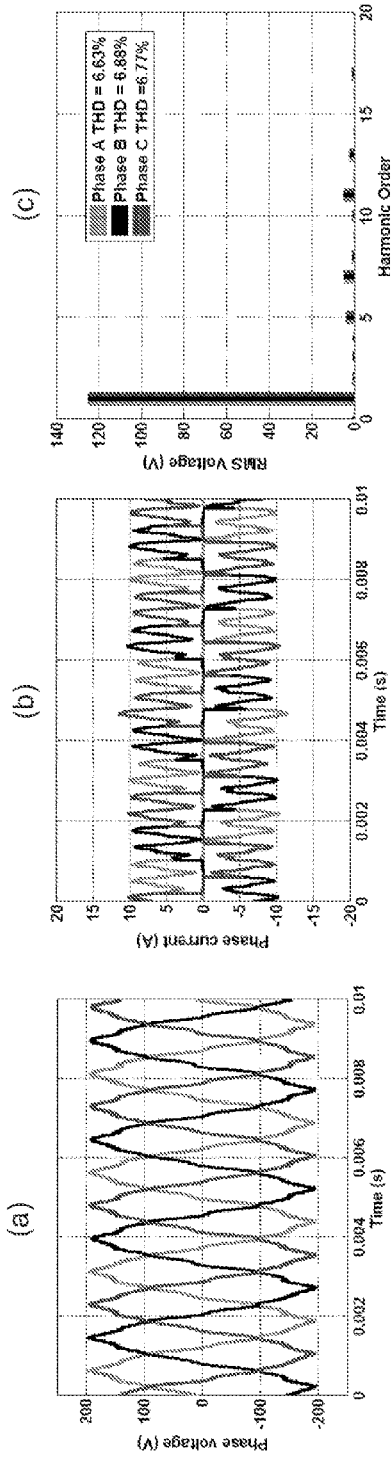
Figure 17:
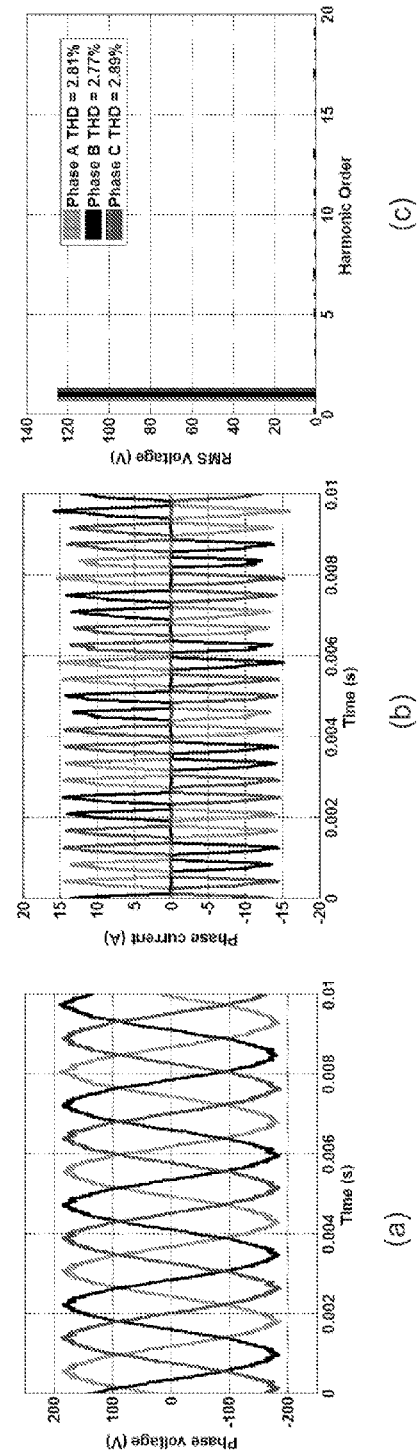
Figure 18:
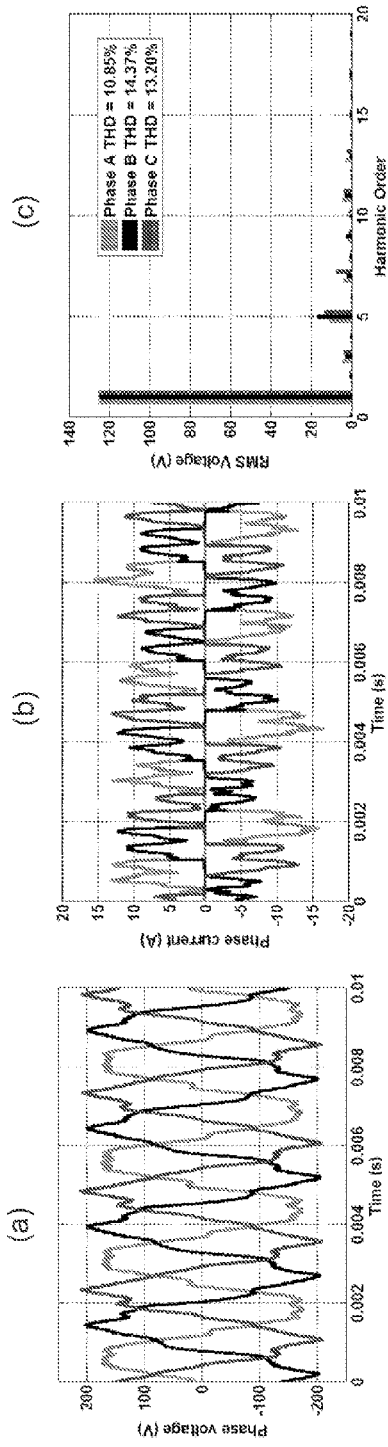
Figure 19:
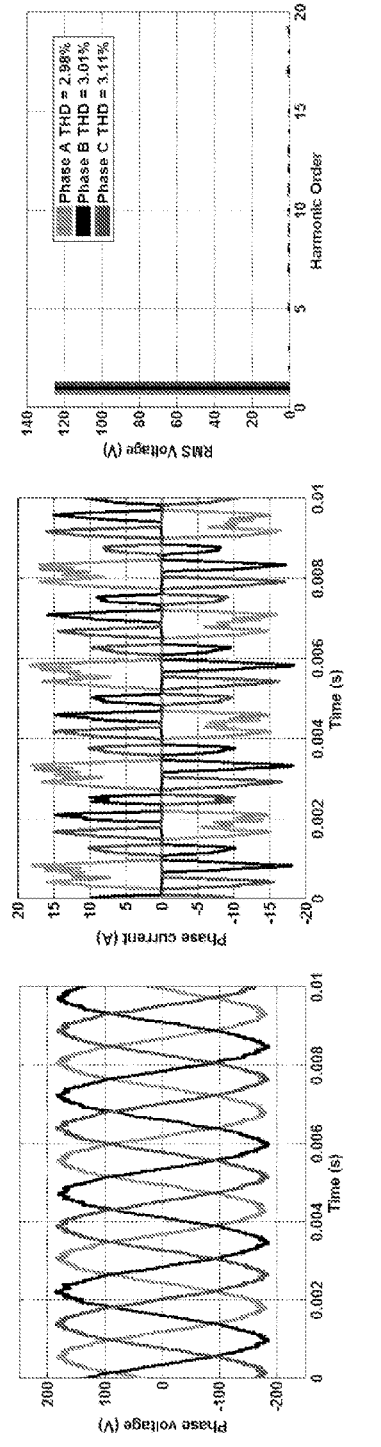
Figure 22:
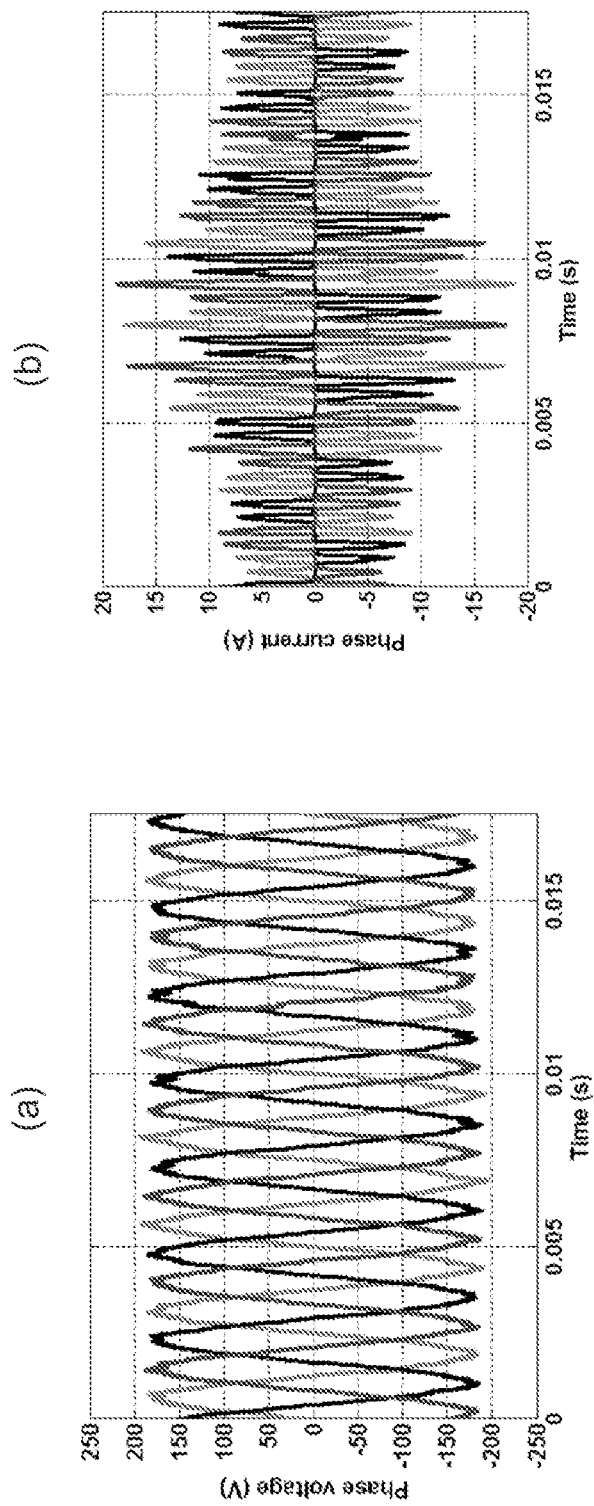

The dq transformations of the signals shown in FIG. 13(b) through FIG. 13(d) are shown in FIG. 14(a) through FIG. 14(c), respectively. In FIG. 14(a), the dq transformations of the positive sequence signals contain 6th, 12th, 18th, etc. harmonics. In FIG. 14(b), the signals of the dq transformation of the negative sequence contain 4th, 10th, 16th, etc. harmonics. In FIG. 14(c), the signals of the dq transformation of the zero sequence contain 2nd, 8th, 14th, etc. harmonics.

A further three-phase waveform $V_{abcn}$ is shown in FIG. 15(a). The decomposed symmetric sequences are shown in FIG. 15(b), while the harmonic orders for one phase of $V_{abcn}$ are shown in FIG. 15(c). The decomposed positive sequence $V_{abcn,p}$ is primarily comprised of the 7th harmonic, the negative sequence $V_{abcn,n}$ is primarily comprised of the 5th harmonic, and the decomposed zero sequence $V_{abcn,h}$ is primarily comprised of the 3rd harmonic, all of which are shown in FIG. 15(b).

The harmonic orders of the signals in FIG. 15(a), as shown in FIG. 15(c), contain 3rd, 5th, and 7th order harmonics. After transforming the sequences into the dq coordinate system, the fundamental frequency component will appear as a dc component, while the nth harmonic in the dq coordinate system will become an (n−1)th harmonic. Since the influence of many load disturbances is mainly caused by odd current harmonics, those harmonics in the positive sequence, negative, and zero sequence will become even harmonics in the dq coordinate system and can both be processed in the same manner using the same parameters. But the positive sequence only has the $6^{th}$ harmonic.

In view of these relationships between the harmonics, the transfer functions C(z) and S(z) (comprising $F_{high}$(z), $F_{notch}$(z), and $F_{low}$(z)) of the sub-channels of the positive sequence channel 195 and negative sequence channel 200 use the same parametric values. However, transfer functions C(z) and S(z) (consisting of $F_{high}$(z), $F_{notch}$(z), and $F_{low}$(z)) of the sub-channels of the zero sequence channel 205 have parametric values that differ from those used in the positive sequence channel 195 and negative sequence channel 200. Examples of these transfer functions as they pertain to the positive, negative, and zero sequences are set forth above.

Simulations

FIGS. 16-22 are signal graphs that may be used to compare power systems employing the control system 110 with those using, for example, a linear control system alone. FIG. 16(a)

shows the phase voltages in a power system using a linear control system, where the power system is connected to a balanced non-linear load, while FIG. 16(b) shows the corresponding phase currents. With reference to FIG. 16(c), the phase voltages and phase currents include substantial harmonic levels at the 5th, 7th, 11th, and 13th harmonics.

FIGS. 17(a) and 17(b) show the phase voltages and phase currents in a power system that includes the disclosed control system 110. As in FIG. 16, the power system is connected to a balanced non-linear load. With reference to FIG. 17(c), however, the levels of the 5th, 7th, 11th, and 13th harmonics are lower compared to the harmonics shown in FIG. 16, and the resulting total harmonic distortion has been significantly reduced.

FIG. 18(a) shows the phase voltages in a power system using a linear control system alone, where the power system is connected to an unbalanced non-linear load, FIG. 18(b) shows the corresponding phase currents. With reference to FIG. 18(c), the phase voltages and phase currents include substantial harmonic levels at the 3rd, 5th, 7th, 9th, 11th, and 13th harmonics.

FIGS. 19(a) and 19(b) show the phase voltages and phase currents in a power system that includes the disclosed control system 110. As in FIG. 18, the power system is connected to an unbalanced non-linear load. With reference to FIG. 19(c), the levels of the 3rd, 5th, 7th, 9th, 11th, and 13th harmonics are lower compared to the results of FIG. 18, and the resulting total harmonic distortion has been significantly reduced.

FIGS. 20(a) and 20(b) illustrate the phase voltage and phase current responses, respectively, at the output of the power system 100 under transient conditions when using the disclosed control system 110. In this instance, the power system 100 is subject to a step load transition as the load changes from a balanced linear load condition to an unbalanced linear load condition and then back to a balanced linear load. The use of the control system 110 results in a faster dynamic response to transients compared to repetitive control alone, or PR control alone, which can take at least one to three fundamental cycles to respond.

FIGS. 21(a) and 21(b) illustrate the phase voltage and phase current responses, respectively, at the output of the power system 100 having control system 110 under transient conditions. Here, the transient conditions occur during a step non-linear load transition from a lighter balanced non-linear load condition to a heavier linear load condition and then back to a lighter balanced non-linear load. The use of the control system 110 results in a faster dynamic response to the transient compared to repetitive control alone and PR control alone, which typically take at least one to three fundamental cycles to respond to the transient. Further, in this kind of loading condition, linear control performs poorly on the harmonic suppression.

FIGS. 22(a) and 22(b) illustrate the phase voltage and phase current responses, respectively, at the output of the power system 100 during a step transient from a balanced non-linear load to an unbalanced non-linear load, and then back to balanced non-linear load. The use of the control system 110 results in a faster dynamic response compared to the transient response of repetitive control alone and PR control alone, which typically take at least one to three fundamental cycles to respond to the transient, which typically take at least one to three fundamental cycles to respond to the transient. The transient response shown in FIGS. 22(a) and 22(b) is fast since the dominant frequency (400 Hz) transient is fast. The transients of the corresponding harmonic signals lag that of the fundamental frequency, but this lag only affects the total harmonic distortion to a small degree during the transient.

Comparatively, controllers that solely use linear controlled symmetric sequences are not suitable for such non-linear load conditions since they have poor harmonic suppression, while controllers that solely use repetitive control or PR control are not suitable for such non-linear load conditions since their slow response may result in severe over-voltage and/or under-voltage during the transient.

Example of Control Method

FIG. 23 illustrates a method that may be used to control a three-phase power system, where the three-phase power system is configured to provide phase voltages at a fundamental frequency. In accordance with the method, positive sequence error signals are processed in a dq coordinate system using positive sequence harmonic repetitive control, positive sequence repetitive control compensation, and positive sequence fundamental frequency control to generate corresponding positive sequence control signals. The positive sequence fundamental frequency control is executed in parallel with the positive sequence harmonic repetitive control and the positive sequence repetitive control compensation.

Negative sequence error signals are processed in the dq coordinate system using negative sequence harmonic repetitive control, negative sequence repetitive control compensation, and negative sequence fundamental frequency control to generate corresponding negative sequence control signals. The negative sequence fundamental frequency control is executed in parallel with the negative sequence harmonic repetitive control and the negative sequence repetitive control compensation.

Zero sequence error signals are processed in the dq coordinate system using zero sequence harmonic repetitive control, zero sequence repetitive control compensation, and zero sequence fundamental frequency control to generate corresponding zero sequence control signals. The zero sequence fundamental frequency control is executed in parallel with the zero sequence harmonic repetitive control and the zero sequence repetitive control compensation.

Some specific operations that may be used in the control method are shown in FIG. 23. As illustrated, voltage signals corresponding to the phase voltages of the power supply are received at operation 605. The received voltage signals are decomposed into positive, negative, and zero sequences at operation 610, and each sequence is subject to an abc-dq transformation. More particularly, the positive sequence is transformed at operation 615, the negative sequence at operation 620, and the zero sequence at operation 625. Also, error signals are generated for the d-axis component and q-axis component for the positive sequence at operation 615, for the negative sequence at operation 620, and for the zero sequence at operation 625.

The d-axis component and q-axis component of the error signals for each sequence undergo respective fundamental frequency control and harmonic repetitive control operations, which take place in parallel with one another. In the example, the fundamental frequency control operations are executed as two-pole control operations. Consequently, a two-pole control operation and a harmonic repetitive control operation are executed on the d-axis component $E_{d,p}$ of the positive sequence error signals at operations 630 and 635, respectively. Here, the harmonic repetitive control operation 635 is at the 6th order of the fundamental frequency. The results of the operations are added to one another in a summing operation 640 to generate a control signal $Y_{d,p}$. The control signal $Y_{d,p}$ is provided as an input to operation 645, which executes an dq-abc transformation.

With respect to the q-axis component of the positive sequence error signal, a two-pole control operation and a harmonic repetitive control operation are executed on the q-axis component $E_{q,p}$ at operations 647 and 653, respectively. Again, the harmonic repetitive control operation 653 is at the 6th order of the fundamental frequency. The results of the operations are added to one another in a summing operation 655 to generate a control signal $Y_{q,p}$. The control signal $Y_{q,p}$ is provided as an input to dq-abc transformation operation 645.

With respect to the negative sequence error signal, a two-pole control operation and a harmonic repetitive control operation are executed on the d-axis component $E_{d,n}$ at operations 660 and 665, respectively. Here, the harmonic repetitive control operation 665 is at the 2nd order of the fundamental frequency. The results of the operations are added to one another in a summing operation 670 to generate a control signal $Y_{d,n}$. The control signal $Y_{d,n}$ is provided as an input to dq-abc transformation operation 645.

With respect to the q-axis component of the negative sequence error signal, a two-pole control operation and a harmonic repetitive control operation are executed on the q-axis component $E_{q,n}$ at operations 675 and 680, respectively. Again, the harmonic repetitive control operation 680 is at the 2nd order of the fundamental frequency. The results of the operations are added to one another in a summing operation 685 to generate a control signal $Y_{q,n}$. The control signal $Y_{q,n}$ is provided as an input to dq-abc transformation operation 645.

With respect to the zero sequence error signal, a two-pole control operation and a harmonic repetitive control operation are executed on the d-axis component $E_{d,h}$ at operations 690 and 695, respectively. Here, the harmonic repetitive control operation 695 is at the 2nd order of the fundamental frequency. The results of the operations are added to one another in a summing operation 700 to generate a control signal $Y_{d,h}$. The control signal $Y_{d,h}$ is provided as an input to dq-abc transformation operation 645.

With respect to the q-axis component of the zero sequence error signal, a two-pole control operation and a harmonic repetitive control operation are executed on the q-axis component $E_{q,h}$ at operations 705 and 710, respectively. Again, the harmonic repetitive control operation 710 is at the 2nd order of the fundamental frequency. The results of the operations are added to one another in a summing operation 715 to generate a control signal $Y_{q,h}$. The control signal $Y_{q,h}$ is provided as an input to dq-abc transformation operation 645.

Operation 640 executes a dq-abc transformation on all of the control signals $Y_{d,p}, Y_{q,p}, Y_{d,n}, Y_{q,n}, Y_{d,h}, Y_{q,h}$, to generate corresponding control signals $Y_{abc,p}, Y_{abc,n}, Y_{abc,h}$ in the abc coordinate system for each of the positive, negative, and zero sequences. The control signals $Y_{abc,p}, Y_{abc,n}, Y_{abc,h}$ are added to one another in summing operation 720 to generate a further set of control signals for each phase voltage of the power system 100. The further set of control signals may be subject to an over modulation process at 725 before being compared to a carrier at carrier operation 730, the output of which is used to control the PWM controller 233 (see FIG. 1).

The invention claimed is:

1. A control system for use in controlling a power drive section of a three-phase power system, wherein the three-phase power system is configured to provide phase voltages at a fundamental frequency, the control system comprising:

a positive sequence channel configured to process positive sequence error signals in a dq coordinate system, wherein the positive sequence error signals correspond to positive sequences of the phase voltages, wherein the positive sequence channel includes at least one harmonic repetitive controller, at least one repetitive controller compensator, and at least one fundamental frequency controller configured to operate in parallel with the at least one harmonic repetitive controller and the at least one repetitive controller compensator, wherein the repetitive controller compensator of the positive sequence channel is configured with a first frequency response;

a negative sequence channel configured to process negative sequence error signals in the dq coordinate system, wherein the negative sequence error signals correspond to negative sequences of the phase voltages, wherein the negative sequence channel includes at least one harmonic repetitive controller, at least one repetitive controller compensator, and at least one fundamental frequency controller configured to operate in parallel with the at least one harmonic repetitive controller and the at least one repetitive controller compensator, wherein the repetitive controller compensator of the negative sequence channel is configured with the first frequency response; and a zero sequence channel configured to process zero sequence error signals in the dq coordinate system, wherein the zero sequence error signals correspond to zero sequences of the phase voltages, wherein the zero sequence channel includes at least one harmonic repetitive controller, at least one repetitive controller compensator, and at least one fundamental frequency controller configured to operate in parallel with the at least one harmonic repetitive controller and the at least one repetitive controller compensator, wherein the repetitive controller compensator of the zero sequence channel is configured with a second frequency response that is different from the first frequency response.

2. The control system of claim 1, wherein the first frequency response includes a negative notch at a corner frequency of the power drive section in both the positive sequences and negative sequences of the phase voltages.

3. The control system of claim 1, wherein the second frequency response includes a negative notch at a corner frequency of the power drive section in the zero sequences of the phase voltages.

4. The control system of claim 1, wherein the at least one fundamental frequency controller of the positive sequence channel and the at least one fundamental frequency controller of the negative sequence channel each have a pole at a frequency below an overshoot frequency of the power drive section.

5. The control system of claim 1, wherein the at least one fundamental frequency controller of the zero sequence channel has a pole at a frequency above an overshoot frequency of the power drive section.

6. The control system of claim 1, wherein each repetitive controller compensator has a transfer function of $S(z)$ comprised of a high-pass filter function $F_{high}(z)$, a zero-phase-shift notch-filter function $F_{notch}(z)$, and a low-pass filter function $F_{low}(z)$, wherein the functions $F_{high}(z)$, $F_{notch}(z)$, and $F_{low}(z)$ have a general form of:

$$F_{high}(z) = \frac{k_h(z-1)}{z - p_h}$$

$$F_{notch}(z) = \frac{z^{2n} + 2z^n + 1}{4z^{2n}}$$

$$F_{low}(z) = \frac{k_l(z - z_1)}{(z - p_{l1})(z - p_{l2})}$$

wherein $p_h$ defines a cross-over frequency to compensate for gains of a respective harmonic repetitive controller, $k_l$ defines a gain selected to provide unity gain in a low frequency range of the respective harmonic repetitive controller, $z_l$ defines a variable selected to provide zero phase delay in a low frequency range of the respective harmonic repetitive controller, $p_{l1}$ and $p_{l2}$ define respective poles selected to provide damping in a high frequency range of the respective harmonic repetitive controller, n defines a variable selected to provide a notch effect around a corner frequency of the power drive section for a respective sequence of the phase voltages, $k_h$ defines a proportional gain selected based on a gain in a low frequency range of the respective harmonic repetitive controller, and z defines a frequency of the phase voltages.

7. The control system of claim 1, wherein each fundamental frequency controller has a general transfer function of:

$$C(z) = \frac{k_c(z - z_c)}{(z - 1)(z - p_c)}$$

wherein $p_c$ defines a pole located selectively above or below an overshoot frequency of the power drive section depending on whether the fundamental frequency is included in the positive, negative, or zero sequence channel, the value of zero $z_c$ defines a phase margin, the value of $k_c$ defines system robustness and bandwidth, and z defines a frequency of the phase voltages.

8. The control system of claim 1, wherein the repetitive controller compensator of the positive sequence channel and the repetitive controller compensator of the negative sequence channel are each configured to use a first set of processing parameters, and the repetitive controller compensator of the zero sequence channel is configured to use a second set of processing parameters having at least one parameter that is different from the first set of processing parameters.

9. The control system of claim 1, wherein the fundamental frequency controller of the positive sequence channel and the fundamental frequency controller of the negative sequence channel are each configured to use a third set of processing parameters, and wherein the fundamental frequency controller of the zero sequence channel is configured to use a fourth set of processing parameters having at least one parameter that is different from the third set of processing parameters.

10. The control system of claim 1, wherein each repetitive controller compensator comprises a low-pass filter, a notch-filter, and a high-pass filter.

11. The control system of claim 10, wherein the notch-filter of the repetitive controller compensator of the positive sequence channel and the notch-filter of the repetitive controller compensator of the negative sequence channel have a same frequency and phase response, and wherein the notch-filter of the repetitive controller compensator of the zero sequence channel has a frequency and phase response that differs from the frequency and phase response of the positive sequence channel and the negative sequence channel.

12. The control system of claim 1, wherein the harmonic repetitive controller of the positive sequence channel is a 6th order harmonic repetitive controller, and wherein the harmonic repetitive controllers of the negative sequence channel and zero sequence channel are 2nd order harmonic repetitive controllers.

13. The control system of claim 1, wherein each fundamental frequency controller of the positive and negative sequence channels include a two-pole controller having a pole occurring below an overshoot frequency of the power drive section and each frequency controller of the zero sequence channel includes a two-poll controller having a pole occurring above the overshoot frequency of the power drive section.

14. A control system for use in controlling a three-phase power system having a power drive section, wherein the three-phase power system is configured to provide phase voltages at a fundamental frequency, the control system comprising:
   a positive sequence channel having a first positive sequence sub-channel configured to process d-axis components of a positive sequence error signal to generate corresponding positive sequence d-axis control signals, the positive sequence channel further having a second positive sequence sub-channel configured to process q-axis components of the positive sequence error signal to generate corresponding positive sequence q-axis control signals, wherein the positive sequence error signal corresponds to positive sequences of the phase voltages;
   a negative sequence channel having a first negative sequence sub-channel configured to process d-axis components of a negative sequence error signal to generate corresponding negative sequence d-axis control signals, the positive sequence channel further having a second negative sequence sub-channel configured to process q-axis components of the negative sequence error signal to generate corresponding negative sequence q-axis control signals, wherein the negative sequence error signal corresponds to negative sequences of the phase voltages;
   a zero sequence channel having a first zero sequence sub-channel configured to process d-axis components of a zero sequence error signal to generate corresponding positive sequence d-axis control signals, the positive sequence channel further having a second zero sequence sub-channel configured to process q-axis components of the zero sequence error signal to generate corresponding zero sequence q-axis control signals, wherein the zero sequence error signal corresponds to zero sequences of the phase voltages; and
   wherein each sub-channel of the positive sequence channel, the negative sequence channel, and the zero sequence channel includes,
      a harmonic repetitive controller,
      a repetitive controller compensator, and
      a fundamental frequency controller configured to operate in parallel with the harmonic repetitive controller and the repetitive controller compensator.

15. The control system of claim 14, wherein each repetitive controller compensator comprises a low-pass filter, a notch-filter, and a high-pass filter.

16. The control system of claim 14, wherein the harmonic repetitive controllers of the first positive sequence sub-channel and the second positive sequence sub-channel are configured as 6th order harmonic repetitive controllers.

17. The control system of claim 16, wherein the repetitive controller compensators of the first positive sequence sub-channel, the second positive sequence sub-channel, the first negative sequence sub-channel, and the second negative sequence sub-channel are configured with a frequency response having a negative notch at a corner frequency of the power drive section in both the positive sequences and negative sequences of the phase voltages.

18. The control system of claim 17, wherein the harmonic repetitive controllers of the first negative sequence sub-channel, the second negative sequence sub-channel, the first zero sequence sub-channel, and the second zero sequence sub-channel are configured as 2nd order harmonic repetitive controllers.

19. The control system of claim 18, wherein the repetitive controller compensators of the first positive sequence sub-channel, the second positive sequence sub-channel, the first negative sequence sub-channel, and the second negative sequence sub-channel are configured with a frequency response having a negative notch at a corner frequency of the power drive section in both the positive sequences and negative sequences of the phase voltages.

20. A method for controlling a three-phase power system, wherein the three-phase power system is configured to provide phase voltages at a fundamental frequency, the method comprising:

processing positive sequence error signals in a dq coordinate system using positive sequence harmonic repetitive control, positive sequence repetitive control compensation, and positive sequence fundamental frequency control to generate corresponding positive sequence control signals, wherein the positive sequence fundamental frequency control is executed in parallel with the positive sequence harmonic repetitive control and the positive sequence repetitive control compensation;

processing negative sequence error signals in the dq coordinate system using negative sequence harmonic repetitive control, negative sequence repetitive control compensation, and negative sequence fundamental frequency control to generate corresponding negative sequence control signals, wherein the negative sequence fundamental frequency control is executed in parallel with the negative sequence harmonic repetitive control and the negative sequence repetitive control compensation; and processing zero sequence error signals in the dq coordinate system using zero sequence harmonic repetitive control, zero sequence repetitive control compensation, and zero sequence fundamental frequency control to generate corresponding zero sequence control signals, wherein the zero sequence fundamental frequency control is executed in parallel with the zero sequence harmonic repetitive control and the positive sequence repetitive control compensation.

21. The method of claim 20, wherein the positive fundamental frequency control and negative fundamental frequency control have a same frequency and phase response, and wherein the zero fundamental frequency control has a frequency and phase response that is different from the frequency and phase response of the positive fundamental frequency control and negative fundamental frequency control.

* * * * *